United States Patent
Park et al.

(10) Patent No.: US 12,322,870 B2
(45) Date of Patent: Jun. 3, 2025

(54) ELECTRONIC DEVICE HAVING ANTENNA MODULE

(71) Applicant: LG ELECTRONICS INC., Seoul (KR)

(72) Inventors: Byeongyong Park, Seoul (KR); Ilnam Cho, Seoul (KR); Kangjae Jung, Seoul (KR); Kukheon Choi, Seoul (KR); Uisheon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 324 days.

(21) Appl. No.: 18/006,686

(22) PCT Filed: Jul. 27, 2020

(86) PCT No.: PCT/KR2020/009832
§ 371 (c)(1),
(2) Date: Jan. 24, 2023

(87) PCT Pub. No.: WO2022/025302
PCT Pub. Date: Feb. 3, 2022

(65) Prior Publication Data
US 2023/0268669 A1    Aug. 24, 2023

(51) Int. Cl.
*H01Q 21/24* (2006.01)
*H01Q 1/24* (2006.01)
(Continued)

(52) U.S. Cl.
CPC ............. *H01Q 21/24* (2013.01); *H01Q 1/243* (2013.01); *H01Q 3/36* (2013.01); *H01Q 9/28* (2013.01);
(Continued)

(58) Field of Classification Search
CPC ...................................................... H01Q 21/24
See application file for complete search history.

(56) References Cited

U.S. PATENT DOCUMENTS

| | | | | |
|---|---|---|---|---|
| 4,816,838 A * | 3/1989 | Mizuno | ............... | H01Q 21/061 343/702 |
| 2011/0018657 A1* | 1/2011 | Cheng | .................... | H01P 3/121 29/600 |
| 2019/0386396 A1* | 12/2019 | Sato | ..................... | H01Q 21/005 |

FOREIGN PATENT DOCUMENTS

JP          4891698         3/2012
KR    10-2010-0097883      9/2010
(Continued)

OTHER PUBLICATIONS

PCT International Application No. PCT/KR2020/009832, International Search Report dated Apr. 26, 2021, 6 page.

*Primary Examiner* — Hsinchun Liao
(74) *Attorney, Agent, or Firm* — LEE, HONG, DEGERMAN, KANG & WAIMEY

(57) ABSTRACT

An electronic device having an antenna, according to one embodiment, is provided. The electronic device can include an antenna module which is disposed at the lower portion of a display region and which radiates a vertically polarized signal to the front surface of the electronic device. The antenna module can comprise: a slot array antenna disposed in a first region of a flexible substrate to radiate the vertically polarized signal in a millimeter-wave band; and a feeding portion disposed in a second region bent from the first region and in a third region bent from the second region, so as to apply a signal to each slot radiation element of the slot array antenna.

14 Claims, 27 Drawing Sheets

(51) Int. Cl.
  *H01Q 3/36*   (2006.01)
  *H01Q 9/28*   (2006.01)
  *H01Q 9/40*   (2006.01)
  *H01Q 13/10*  (2006.01)
  *H01Q 19/10*  (2006.01)
  *H04M 1/02*   (2006.01)

(52) U.S. Cl.
  CPC ............... *H01Q 9/40* (2013.01); *H01Q 13/10* (2013.01); *H01Q 19/10* (2013.01); *H04M 1/026* (2013.01)

(56) References Cited

FOREIGN PATENT DOCUMENTS

| | | |
|---|---|---|
| KR | 10-2017-0082799 | 7/2017 |
| KR | 10-2019-0019802 | 2/2019 |
| KR | 10-2019-0061798 | 6/2019 |
| KR | 10-2019-0118095 | 10/2019 |

* cited by examiner (a)

(b)

(a)

(b)

FRONT VIEW (a)

SIDE VIEW (b)

(a)

(b)   (c)

(a)

(b)

(a)

(b)

(c)

(d)

(e)

(f)

FRONT VIEW

SIDE VIEW

TOP VIEW

3D VIEW

FRONT VIEW

TOP VIEW

SIDE VIEW

3D VIEW

FRONT VIEW

ELECTRONIC DEVICE HAVING ANTENNA MODULE

CROSS-REFERENCE TO RELATED APPLICATION(S)

This application is the National Stage filing under 35 U.S.C. 371 of International Application No. PCT/KR2020/009832, filed on Jul. 27, 2020, the contents of which is hereby incorporated by reference herein in its entirety.

TECHNICAL FIELD

The present disclosure relates to an electronic device having an antenna module. A particular implementation relates to an electronic device that has an antenna module to send or receive data to or from a nearby device.

BACKGROUND ART

Electronic devices may be classified into mobile/portable terminals and stationary terminals according to mobility. Also, the electronic devices may be classified into handheld types and vehicle mount types according to whether or not a user can directly carry.

Functions of electronic devices are diversifying. Examples of such functions include data and voice communications, capturing images and video via a camera, recording audio, playing music files via a speaker system, and displaying images and video on a display. Some electronic devices include additional functionality which supports electronic game playing, while other terminals are configured as multimedia players. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

Meanwhile, an image display device as an example of an electronic device is an apparatus that receives and processes broadcasting images a user can view, for example. The image display device displays a broadcast on a display which the user selects from a broadcast signal sent out by a broadcasting station.

There is a need to send or receive data between electronic devices by using a mmWave-band communication service between the electronic devices. In relation to this, a wireless AV (audio-video) service may be provided using a 5G communication service.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

A problem with delivering images at a resolution of 4K or more as described above is that there is no concrete solution for an antenna and an RFIC (radio frequency integrated chip) which provide a wireless interface in an electronic device such as an image display device. In particular, wireless AV data needs to be sent to or received from other electronic devices, considering that an electronic device such as an image display device is placed on a wall in a building or on a table. To this end, it is necessary to propose a concrete configuration and an antenna structure regarding in which part of the image display device the antenna and the RFIC are placed.

DISCLOSURE OF INVENTION

Technical Problem

The present disclosure is directed to solving the aforementioned problems and other drawbacks. Another aspect of the present disclosure is to provide an antenna configuration that provides a wireless AV service to an electronic device and an electronic device having an antenna.

Another aspect of the present disclosure is to provide an antenna configuration disposed at a lower portion of an image display device so as to send or receive high-speed, large-volume data.

Another aspect of the present disclosure is to provide multiple input multiple output (MIMO) using different polarizations of an antenna so as to send or receive high-speed, large-volume data.

Another aspect of the present disclosure is to provide an antenna configuration that operates in a millimeter-wave (mmWave) bands which allows for radiating signals toward the front or side of an electronic device.

Solution to Problem

To achieve the above or other aspects, there is provided an electronic device having an antenna, including: a display formed on a front surface of the electronic device and configured to display information on a screen; and an antenna module disposed at a lower portion of the electronic device and configured to radiate a vertically polarized signal to the front surface of the electronic device, the antenna module including: a slot array antenna disposed in a first region of a flexible substrate so as to radiate the vertically polarized signal in a millimeter-wave band; and a feeding portion disposed in a second region bent from the first region and in a third region bent from the second region so as to apply a signal to each of slot radiating elements of the slot array antenna, wherein the first region and third region of the flexible substrate correspond to a front region and rear region of the electronic device.

According to an embodiment, the first region of the flexible substrate may be formed above the second region so as to overlap at least part of the third region of the flexible substrate.

According to an embodiment, a rear radiation signal radiated to the third region through each slot radiating element of the slot array antenna may be reflected by a metal pattern formed in the third region and radiated to the front region, and the metal pattern formed in the third region may correspond to the feeding portion.

According to an embodiment, the distance between the first region and third region of the flexible substrate may be determined within a predetermined range of ¼ of the operation wavelength of the signal, and the rear radiation signal and a front radiation signal may be propagated in phase.

According to an embodiment, the first region of the flexible substrate may be formed below the second region so as not to overlap the third region of the flexible substrate.

According to an embodiment, a rear radiation signal radiated to the third region through each slot radiating element of the slot array antenna may be reflected by a reflector formed in the rear region, apart from the third region, and radiated to the first region.

According to an embodiment, the distance between the first region of the flexible substrate and the reflector may be determined within a predetermined range of ¼ of the operation wavelength of the signal, and the rear radiation signal and a front radiation signal may be propagated in phase.

According to an embodiment, the electronic device may further include: a transceiver circuit operably coupled to the antenna module; and a processor operably coupled to the transceiver circuit and configured to control the transceiver circuit.

According to an embodiment, each of the slot radiating elements may be formed of a circular slot, the feeding portion may be formed along a vertical axis, and a rectangular slot connected to an end of each of the slot radiating elements may be formed along a horizontal axis so as to be perpendicular to the feeding portion.

According to an embodiment, a vertically polarized signal of the feeding portion formed along the vertical axis may be coupled through the rectangular slots, and the processor may control the transceiver circuit so that the vertically polarized signal is beam-formed toward the front surface of the electronic device through the circular slots connected to the rectangular slots.

According to an embodiment, the antenna module may include: a first antenna module including a plurality of slot radiating elements and a first feeding portion so as to radiate a vertically polarized signal toward the front surface of the electronic device; and a second antenna module including a plurality of slot radiating elements and a second feeding portion so as to radiate a horizontally polarized signal toward the front surface of the electronic device.

According to an embodiment, the second antenna module may include: an array antenna disposed in the first region of the second flexible substrate and radiating a horizontally polarized signal in a millimeter-wave band toward the front surface of the electronic device; and a second feeding portion disposed in the first region of the flexible substrate and the second region bent from the first region, so as to apply a signal to each radiating element of the array antenna, wherein the first region and second region of the second flexible substrate correspond to a lower region and rear region of the electronic device.

According to an embodiment, each radiating element of the array antenna may be composed of an end-fire radiating element such as a dipole antenna or a monopole antenna, and the horizontally polarized signal radiated through the array antenna may be beam-formed and radiated toward the front surface of the electronic device.

According to an embodiment, the processor may control the transceiver circuit so as to beam-form a vertically polarized signal by controlling the phase of a signal applied to each slot radiating element of the first antenna module, and the processor may control the transceiver circuit so as to beam-form a horizontally polarized signal by controlling the phase of a signal applied to each radiating element of the second antenna module.

According to an embodiment, the processor may generate a vertically polarized signal through the first antenna module and at the same time generate a horizontally polarized signal through the second antenna module, thereby controlling the transceiver circuit so as to perform MIMO with another electronic device.

According to an embodiment, the processor may perform beamforming of a vertically polarized signal through the first antenna module and at the same time performs beamforming of a horizontally polarized signal through the second antenna module, and the processor may control the transceiver circuit so as to receive or send a vertically polarized signal formed in a first direction and a horizontally polarized signal formed in a second direction from or to another electronic device.

According to an embodiment, the electronic device may be a mobile terminal, signage, a display device, a transparent AR/VR equipment, a vehicle, or wireless audio/video equipment, and the first antenna module or second antenna module constituting the antenna module may be disposed in a lower region or side region of the electronic device.

Another aspect of the present disclosure provides an antenna module provide in an electronic device, the antenna module including: a slot array antenna disposed in a first region of a flexible substrate so as to radiate the vertically polarized signal in a millimeter-wave band; and a feeding portion disposed in a second region bent from the first region and in a third region bent from the second region so as to apply a signal to each of slot radiating elements of the slot array antenna, wherein the first region and third region of the flexible substrate correspond to a front region and rear region of the electronic device.

According to an embodiment, the first region of the flexible substrate may be formed above the second region so as to overlap at least part of the third region of the flexible substrate, and a rear radiation signal radiated to the third region through each slot radiating element of the slot array antenna may be reflected by a metal pattern formed in the third region and radiated to the front region.

According to an embodiment, the first region of the flexible substrate may be formed below the second region so as not to overlap the third region of the flexible substrate, and a rear radiation signal radiated to the third region through each slot radiating element of the slot array antenna may be reflected by a reflector formed in the rear region, apart from the third region, and radiated to the first region.

According to an embodiment, the antenna module may be a first antenna module including a plurality of slot radiating elements and a first feeding portion so as to radiate a vertically polarized signal toward the front surface of the electronic device, and may further include a second antenna module including a plurality of slot radiating elements and a second feeding portion so as to radiate a horizontally polarized signal toward the front surface of the electronic device.

According to an embodiment, the second antenna module may include: an array antenna disposed in the first region of the second flexible substrate and radiating a horizontally polarized signal in a millimeter-wave band toward the front surface of the electronic device; and a second feeding portion disposed in the first region of the flexible substrate and the second region bent from the first region, so as to apply a signal to each radiating element of the array antenna, wherein the first region and second region of the second flexible substrate correspond to a lower region and rear region of the electronic device.

Advantageous Effects of Invention

Technical effects of an array antenna and an electronic device having the same will be described below.

According to an embodiment, a slot array antenna configuration capable of providing a wireless AV service to an electronic device, and an electronic device having a slot array antenna may be provided.

According to an embodiment, a vertically polarized antenna configuration may be provided which is disposed at a lower portion of an image display device so as to send or receive high-speed, large-volume data.

According to an embodiment, multiple input multiple output (MIMO) may be provided by disposing an array antenna having different polarizations so as to send or receive high-speed, large-volume data.

According to an embodiment, a slot array antenna having a reflector structure may be provided which operates in a millimeter-wave (mmWave) band which allows for radiating signals toward the front or side of the electronic device.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

MODE FOR THE INVENTION

Figure 1:
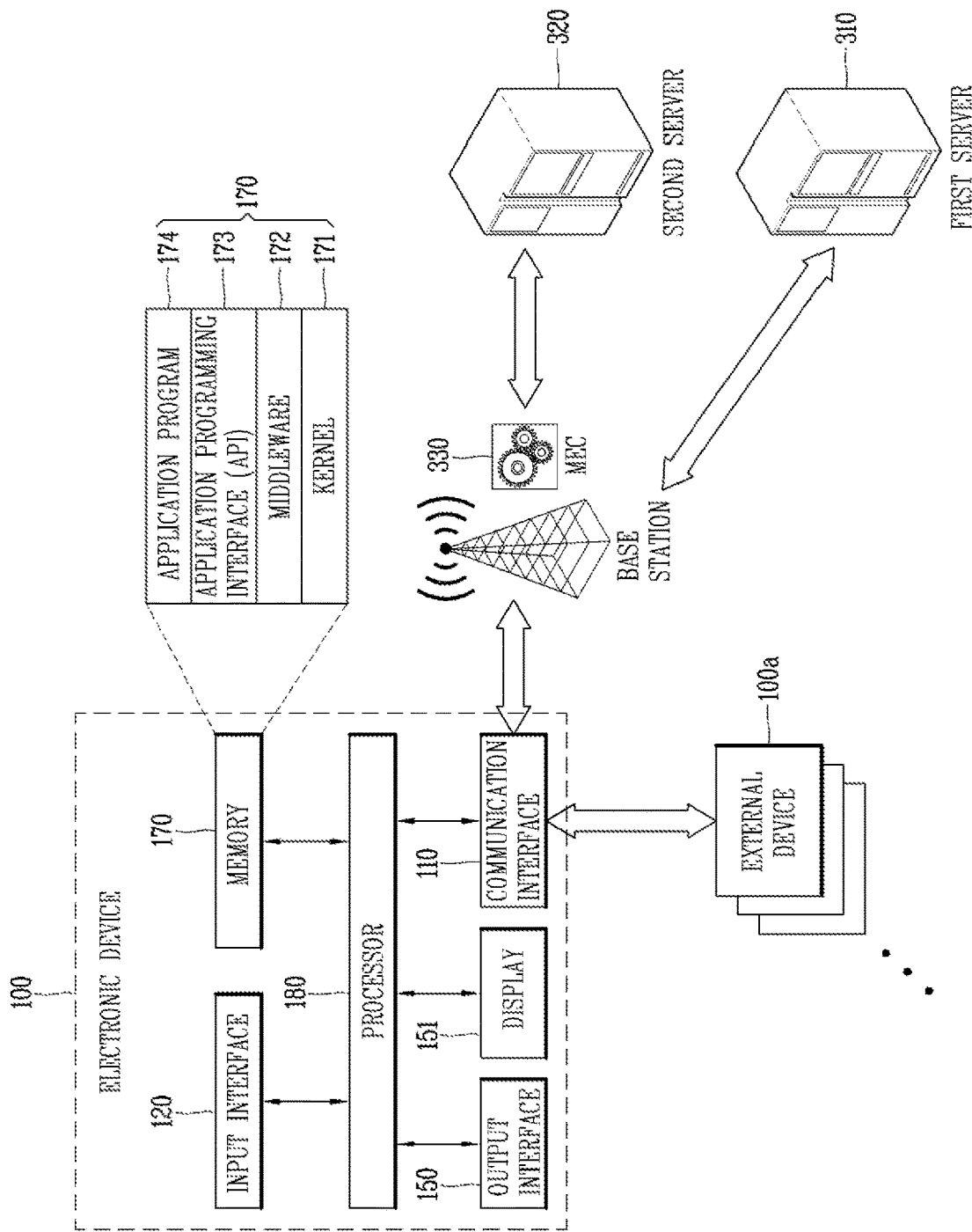
FIG. 1 is a view illustrating a configuration for describing an electronic device in accordance with one embodiment, and an interface between the electronic device and an external device or server.

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMOs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, and the like.

Figure 2A:
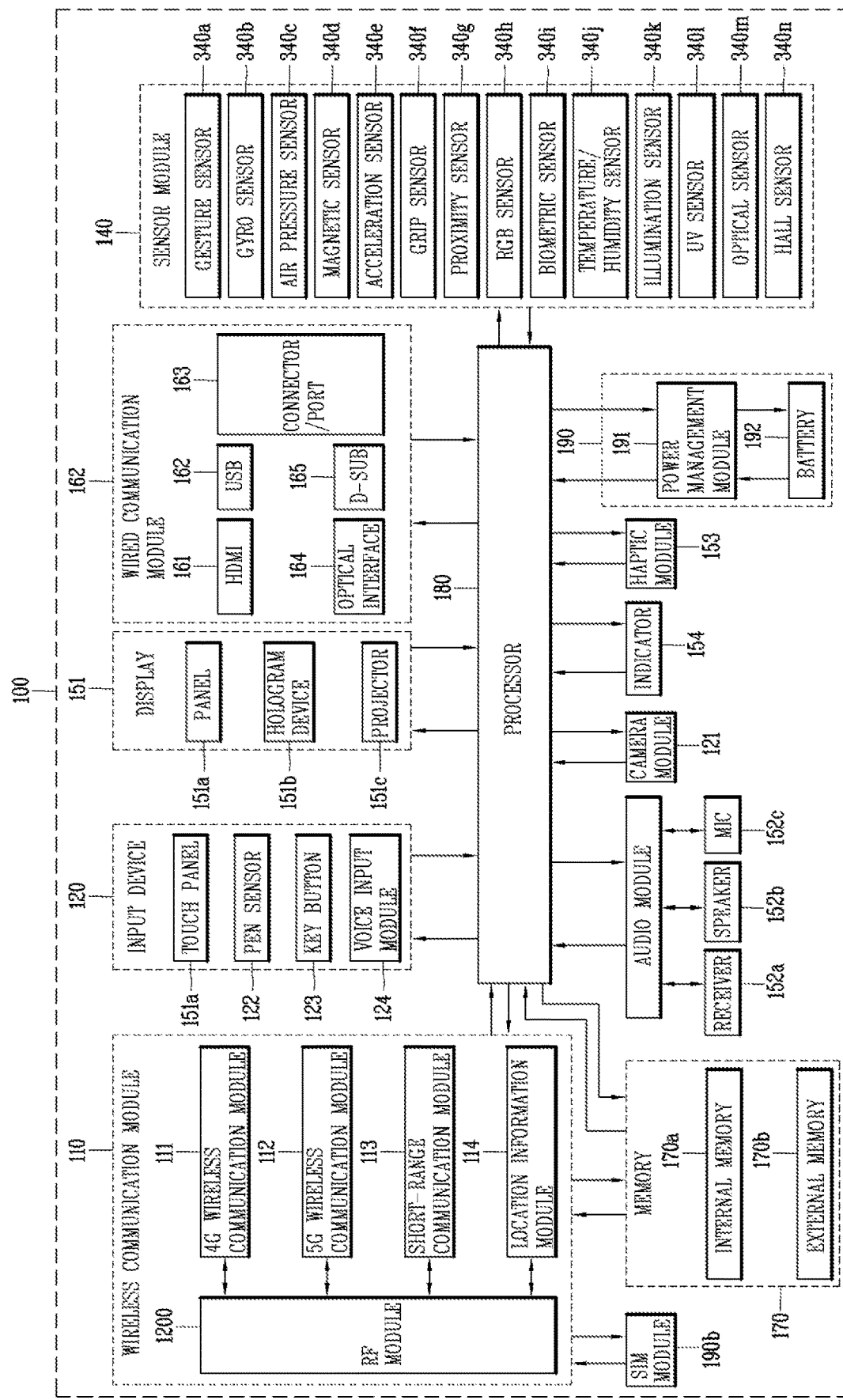
FIG. 2A is a view illustrating a detailed configuration of the electronic device of FIG. 1.

FIG. 1 is a view illustrating a configuration for describing an electronic device in accordance with one embodiment, and an interface between the electronic device and an external device or server. FIG. 2A is a view illustrating a detailed configuration of the electronic device of FIG. 1.

Referring to FIG. 1, the electronic device 100 may include a communication interface 110, an input interface (or an input device) 120, an output interface (or an output device) 150, and a processor 180. Here, the communication interface 110 may refer to the wireless communication module 110. The electronic device 100 may further include a display 151 and a memory 170. It is understood that implementing all of the illustrated components illustrated in FIG. 1 is not a requirement, and that greater or fewer components may alternatively be implemented.

In more detail, among others, the wireless communication module 110 may typically include one or more modules which permit communications such as wireless communications between the electronic device 100 and a wireless communication system, communications between the electronic device 100 and another electronic device, or communications between the electronic device 100 and an external server. Further, the wireless communication module 110 may typically include one or more modules which connect the electronic device 100 to one or more networks. Here, the one or more networks may be, for example, a 4G communication network and a 5G communication network.

Referring to FIGS. 1 and 2A, the wireless communication module 110 may include at least one of a 4G wireless communication module 111, a 5G wireless communication module 112, a short-range communication module 113, and a location information module 114. The 4G wireless communication module 111, the 5G wireless communication module 112, the short-range communication module 113, and the location information module 114 may be implemented as a baseband processor such as a modem. In one example, the 4G wireless communication module 111, the 5G wireless communication module 112, the short-range communication module 113, and the location information module 114 may be implemented as a transceiver circuit operating in an IF band and a baseband processor. The RF module 1200 may be implemented as an RF transceiver circuit operating in an RF frequency band of each communication system. However, the present disclosure may not be limited thereto. Each of the 4G wireless communication module 111, the 5G wireless communication module 112, the short-range communication module 113, and the location information module 114 may include an RF module.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station. In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) architecture. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. In some examples, a Sub 6 frequency band, which is a range of 6 GHz or less, may be used as the 5G frequency band.

On the other hand, a millimeter-wave (mmWave) range may be used as the 5G frequency band to perform wideband high-speed communication. When the mmWave band is used, the electronic device 100 may perform beamforming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals that are received from the 5G base station.

On the other hand, the wireless communication module 110 may be in a Dual Connectivity (DC) state with the 4G base station and the 5G base station through the 4G wireless communication module 111 and the 5G wireless communication module 112. As such, the dual connectivity to the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

When the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112, respectively.

The short-range communication module 113 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area network. One example of the wireless area networks is a wireless personal area network.

Short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and a WiFi communication module. In this regard, 4G+WiFi CA may be performed using the 4G wireless communication module 111 and the Wi-Fi communication module 113. Or, 5G+WiFi CA may be performed using the 5G wireless communication module 112 and the Wi-Fi communication module 113.

The location information module 114 may be generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless Access Point (AP) which transmits or receives a wireless signal to or from the Wi-Fi module. If desired, the location information module 114 may alternatively or additionally function with any of the other modules of the wireless communication module 110 to obtain data related to the position of the electronic device. The location information module 114 is a module used for acquiring the position (or the current position) and may not be limited to a module for directly calculating or acquiring the position of the electronic device.

Specifically, when the electronic device utilizes the 5G wireless communication module, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input device 120 may include a pen sensor 1200, a key button 123, a voice input module 124, a touch panel 151*a*, and the like. The input device 120 may include a camera module 121 or an image input unit for obtaining images or video, a microphone 152*c* or an audio input unit for inputting an audio signal, and a user input unit 123 (for example, a touch key, a mechanical key, and the like) for allowing a user to input information. Data (for example, audio, video, image, and the like) may be obtained by the input device 120 and may be analyzed and processed according to user commands.

The camera module 121 is a device capable of capturing still images and moving images. According to one embodiment, the camera module 121 may include one or more image sensors (e.g., a front sensor or a rear sensor), a lens, an image signal processor (ISP), or a flash (e.g., LED or lamp).

The sensor module 140 may typically be implemented using one or more sensors configured to sense internal information of the electronic device, the surrounding environment of the electronic device, user information, and the like. For example, the sensor module 140 includes at least one of a gesture sensor 340*a*, a gyro sensor 340*b*, an air pressure sensor 340*c*, a magnetic sensor 340*d*, an acceleration sensor 340*e*, a grip sensor 340*f*, and a proximity sensor 340*g*, a color sensor 340*h* (e.g., RGB (red, green, blue) sensor), a bio-sensor 340*i*, a temperature/humidity sensor 340*j*, an illuminance sensor 340*k*, an ultra violet (UV) sensor 340*l*, a light sensor 340*m*, and a hall sensor 340*n*. The sensor module 140 may also include at least one of a finger scan sensor, an ultrasonic sensor, an optical sensor (for example, camera 121), a microphone (see 152*c*), a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output interface 150 may typically be configured to output various types of information, such as audio, video, tactile output, and the like. The output interface 150 may be shown having at least one of a display 151, an audio module 152, a haptic module 153, and an indicator 154.

The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user. For example, the display 151 may include a liquid crystal display (LCD), a light emitting diode (LED) display, an organic light emitting diode (OLED) display, a micro electromechanical systems (MEMS) display, or an electronic paper. For example, the display 151 may display various contents (e.g., text, images, videos, icons, and/or symbols, etc.). The display 151 may include a touch screen, and may receive, for example, a touch, gesture, proximity, or hovering input using an electronic pen or a part of the user's body.

Meanwhile, the display 151 may include a touch panel 151*a*, a hologram device 151*b*, a projector 151*c*, and/or a control circuit for controlling them. In this regard, the panel may be implemented to be flexible, transparent, or wearable. The panel may include the touch panel 151*a* and one or more modules. The hologram device 151*b* may display a stereoscopic image in the air by using light interference. The projector 151*c* may display an image by projecting light onto a screen. The screen may be located inside or outside the electronic device 100, for example.

The audio module 152 may interwork with the receiver 152*a*, the speaker 152*b*, and the microphone 152*c*. Meanwhile, the haptic module 153 may convert an electrical signal into a mechanical vibration, and generate a vibration or a haptic effect (e.g., pressure, texture). The electronic device may include a mobile TV supporting device (e.g., a GPU) that may process media data as per, e.g., digital multimedia broadcasting (DMB), digital video broadcasting (DVB), or mediaFlo™ standards. The indicator 154 may indicate a particular state of the electronic device 100 or a part (e.g., the processor 310) of the electronic device, including, e.g., a booting state, a message state, or a recharging state.

The wired communication module 160 which may be implemented as an interface unit may serve as a passage with various types of external devices connected to the electronic device 100. The wired communication module 160 may include an HDMI 162, a USB 162, a connector/port 163, an optical interface 164, or a D-subminiature (D-sub) 165. can do. The wired communication module 160, for example, may include any of wired or wireless ports, external power supply ports, wired or wireless data ports, memory card ports, ports for connecting a device having an identification module, audio input/output (I/O) ports, video I/O ports, earphone ports, and the like. The electronic device 100 may perform assorted control functions associated with a connected external device, in response to the external device being connected to the wired communication module 160.

The memory 170 is typically implemented to store data to support various functions or features of the electronic device 100. For instance, the memory 170 may be configured to store application programs executed in the electronic device 100, data or instructions for operations of the electronic device 100, and the like. At least some of these application programs may be downloaded from an external server (e.g., a first server 310 or a second server 320) through wireless communication. Other application programs may be installed within the electronic device 100 at the time of manufacturing or shipping, which is typically the case for basic functions of the electronic device 100 (for example, receiving a call, placing a call, receiving a message, sending a message, and the like). Application programs may be stored in the memory 170, installed in the electronic device 100, and executed by the processor 180 to perform an operation (or function) for the electronic device 100.

In this regard, the first server 310 may be referred to as an authentication server, and the second server 320 may be referred to as a content server. The first server 310 and/or the second server 320 may be interfaced with the electronic device through a base station. Meanwhile, a part of the second server 320 corresponding to the content server may be implemented as a mobile edge cloud (MEC) 330 in units of base stations. This can implement a distributed network through the second server 320 implemented as the mobile edge cloud (MEC) 330, and shorten content transmission delay.

The memory 170 may include a volatile memory and/or a non-volatile memory. The memory 170 may also include an internal memory 170*a* and an external memory 170*b*. The memory 170 may store, for example, commands or data related to at least one of other components of the electronic device 100. According to an implementation, the memory 170 may store software and/or a program 240. For example, the program 240 may include a kernel 171, middleware 172, an application programming interface (API) 173, or an application program (or "application") 174, and the like. At least some of the kernel 171, the middleware 172, and the API 174 may be referred to as an operating system (OS).

The kernel 171 may control or manage system resources (e.g., the bus, the memory 170, or the processor 180) that are used for executing operations or functions implemented in other programs (e.g., the middleware 172, the API 173, or the application program 174). In addition, the kernel 171 may provide an interface to control or manage system resources by accessing individual components of the electronic device 100 in the middleware 172, the API 173, or the application program 174.

The middleware 172 may play an intermediary so that the API 173 or the application program 174 communicates with the kernel 171 to exchange data. Also, the middleware 172 may process one or more task requests received from the application program 247 according to priorities. In one embodiment, the middleware 172 may give at least one of the application programs 174 a priority to use the system resources (e.g., the bus, the memory 170, or the processor 180) of the electronic device 100, and process one or more task requests. The API 173 is an interface for the application program 174 to control functions provided by the kernel 171 or the middleware 1723, for example, at least one for file control, window control, image processing, or text control. Interface or function, for example Command).

The processor 180 may typically function to control an overall operation of the electronic device 100, in addition to the operations associated with the application programs. The processor 180 may provide or process information or functions appropriate for a user by processing signals, data, information and the like, which are input or output by the aforementioned various components, or activating application programs stored in the memory 170. Furthermore, the processor 180 may control at least part of the components illustrated in FIGS. 1 and 2A, in order to execute the application programs stored in the memory 170. In addition, the processor 180 may control a combination of at least two of those components included in the electronic device 100 to activate the application program.

The processor 180 may include one or more of a central processing unit (CPU), an application processor (AP), an image signal processor (ISP), a communication processor (CP), and a low power processor (e.g., sensor hub). For example, the processor 180 may execute a control of at least one of other components of the electronic device 100 and/or an operation or data processing related to communication.

The power supply unit 190 may be configured to receive external power or provide internal power in order to supply appropriate power required for operating elements and components included in the electronic device 100. The power supply unit 190 may include a power management module 191 and a battery 192, and the battery 192 may be a built-in battery or a replaceable battery. The power management module 191 may include a power management integrated circuit (PMIC), a charger IC, or a battery or fuel gauge. The PMIC may employ a wired and/or wireless charging method. The wireless charging method may include, for example, a magnetic resonance method, a magnetic induction method or an electromagnetic wave method, and may further include an additional circuit for wireless charging, for example, a coil loop, a resonance circuit, or a rectifier. The battery gauge may measure, for example, a remaining battery level, and voltage, current, or temperature during charging. For example, the battery 192 may include a rechargeable cell and/or a solar cell.

Each of the external device 100a, the first server 310, and the second server 320 may be the same or different type of device (e.g., external device or server) as or from the electronic device 100. According to an embodiment, all or some of operations executed on the electronic device 100 may be executed on another or multiple other electronic devices (e.g., the external device 100a, the first server 310 and the second server 320. According to an implementation, when the electronic device 100 should perform a specific function or service automatically or at a request, the electronic device 100 may request another device (e.g., the external device 100a, the first server 310, and the second server 320) to perform at least some functions associated therewith, instead of executing the function or service on its own or additionally. The another electronic device (e.g., the external device 100a, the first server 310, and the second server 320) may execute the requested function or additional function and transfer a result of the execution to the electronic device 100. The electronic device 100 may provide the requested function or service by processing the received result as it is or additionally. For this purpose, for example, cloud computing, distributed computing, client-server computing, or mobile edge cloud (MEC) technology may be used.

At least part of the components may cooperably operate to implement an operation, a control or a control method of an electronic device according to various implementations disclosed herein. Also, the operation, the control or the control method of the electronic device may be implemented on the electronic device by an activation of at least one application program stored in the memory 170.

Referring to FIG. 1, a wireless communication system may include an electronic device 100, at least one external device 100a, a first server 310, and a second server 320. The electronic device 100 may be functionally connected to at least one external device 100a, and may control contents or functions of the electronic device 100 based on information received from the at least one external device 100a. According to an implementation, the electronic device 100 may use the servers 310 and 320 to perform authentication for determining whether the at least one external device 100 includes or generates information conforming to a predetermined rule. Also, the electronic device 100 may display contents or control functions differently by controlling the electronic device 100 based on the authentication result. According to an implementation, the electronic device 100 may be connected to at least one external device 100a through a wired or wireless communication interface to receive or transmit information. For example, the electronic device 100 and the at least one external device 100a include a near field communication (NFC), a charger (e.g., Information can be received or transmitted in a universal serial bus (USB)-C, ear jack, Bluetooth (BT), wireless fidelity (WiFi), or the like.

The electronic device 100 may include at least one of an external device authentication module 100-1, a content/function/policy information DB 100-2, an external device information DB 100-3, or a content DB 104. The at least one external device 100a which is an assistant device linked with the electronic device 100, may be a device designed for various purposes, such as convenience of use, more attractive appearance, enhancement of usability, etc. of the electronic device 100. At least one external device 100a may or may not be in physical contact with the electronic device 100. According to one implementation, the at least one external device 100a may be functionally connected to the electronic device 100 using a wired/wireless communication module to control information for controlling content or a function in the electronic device 100.

Meanwhile, the first server 310 may include a server or a cloud device for services related to the at least one external device 100a or a hub device for controlling services in a smart home environment. The first server 310 may include at least one of an external device authentication module 311, a content/function/policy information DB 312, an external device information DB 313, and an electronic device/user DB 314. The first server 310 may be referred to as an authentication management server, an authentication server, or an authentication-related server. The second server 320 may include a server or a cloud device for providing a service or content, or a hub device for providing a service in a smart home environment. The second server 320 may include at least one of a content DB 321, an external device specification information DB 322, a content/function/policy information management module 323, or a device/user authentication/management module 324. The second server 130 may be referred to as a content management server, a content server, or a content-related server.

Figure 2B:
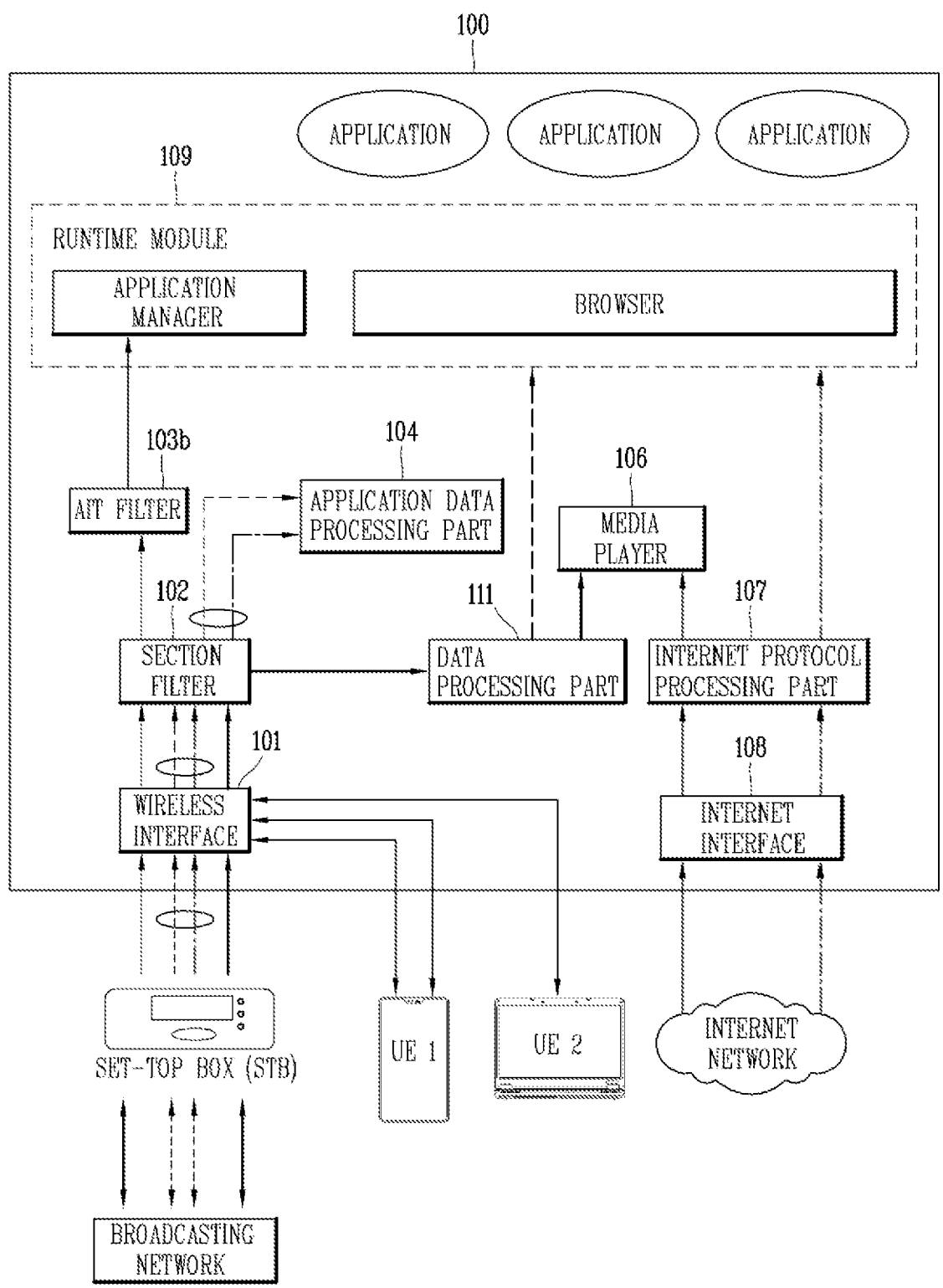
FIG. 2B is a view schematically illustrating an example of an entire wireless AV system including an image display device in accordance with another embodiment of the present disclosure.

FIG. 2B is a view schematically illustrating an example of an entire wireless AV system including an image display device in accordance with another embodiment of the present disclosure.

As illustrated in FIG. 2B, an image display device 100 according to another embodiment of the present disclosure is connected to a wireless AV system (or broadcasting network) and an internet network. The image display device 100 may be a network TV, a smart TV, or an HBBTV, for example.

Meanwhile, the image display device 100 may be connected wirelessly to a wireless AV system (or broadcasting network) via a wireless interface or connected wirelessly or with wires to an internet network via an internet interface. In relation to this, the image display device 100 may be configured to be connected to a server or another electronic device through a 4G communication system or a 5G communication system. For example, the image display device 100 needs to provide a 5G communication service that operates in an mmWave band so as to send or receive large-volume, high-speed data.

Meanwhile, the image display device 100 may send or receive data wirelessly to and from an electronic device around the image display device 100, for example, a set-top box, or other electronic devices 100. For example, the image display device 100 may send or receive wireless AV data to or from a set-top box disposed on a front surface of or at a lower portion of the image display device or other electronic devices, such as a mobile terminal.

The image display device 100 includes, for example, a wireless interface 101*b*, a section filter 102*b*, an AIT filter 103*b*, an application data processing part 104*b*, a data processing part 111*b*, a media player 106*b*, an internet protocol processing part 107*b*, an internet interface 108*b*, and a runtime module 109*b*.

AIT (Application Information Table) data, real-time broadcast content, application data, and stream events are received via the wireless interface 101*b*. Meanwhile, the real-time broadcast content may be called linear A/V content.

The section filter 102*b* performs section filtering of four types of data received via the wireless interface 101*b* to transmit AIT data to the AIT filter 103*b*, transmit linear A/V content to the data processing part 111*b*, and transmit stream events and application data to the application data processing part 104*b*.

Meanwhile, non-linear A/V content and application data are received via the internet interface 108*b*. The non-linear A/V content may be COD (content on demand), for example.

The non-linear A/V content is transmitted to the media player 106*b*, and the application data is transmitted to the runtime module 109*b*.

Furthermore, the runtime module 109*b* includes, for example, an application manager and a browser, as illustrated in FIG. 2B. The application manager controls the life cycle of an interactive application by using AIT data, for example. Also, the browser performs a function of displaying and processing the interactive application, for example.

Hereinafter, embodiments related to an array antenna operating in a mmWave band and an electronic device having the same will be described with reference to the accompanying drawings. It will be apparent to those skilled in the art that the present disclosure may be embodied in other specific forms without departing from the spirit and essential characteristics of the disclosure.

Hereinafter, detailed operations and functions of an electronic device having a plurality of antennas according to one implementation that includes the 4G/5G communication modules as illustrated in FIG. 2A will be discussed. In a 5G communication system according to an embodiment, a 5G frequency band may be a higher frequency band than a sub-6 band. For example, the 5G frequency band may be an mmWave band but is not limited thereto, and may be changed depending on applications.

Figure 3A:
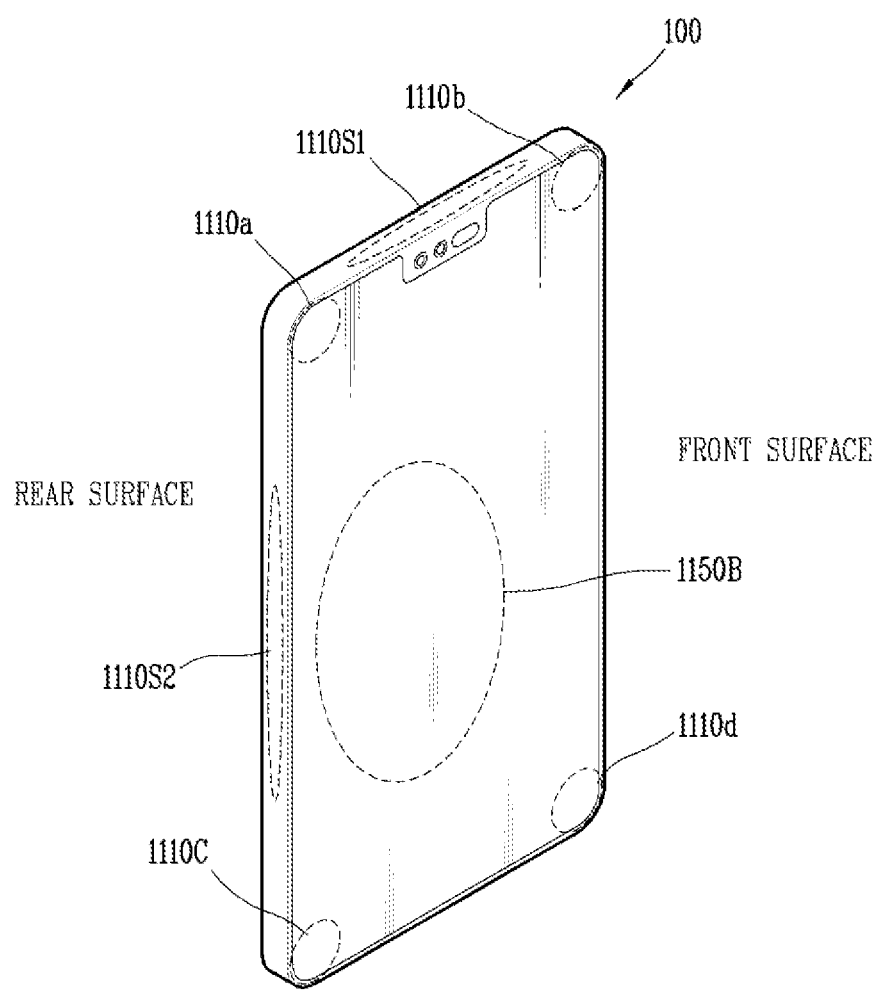
FIG. 3A illustrates an exemplary configuration in which a plurality of antennas of the electronic device can be arranged.

FIG. 3A illustrates an exemplary configuration in which a plurality of antennas of the electronic device can be arranged. Referring to FIG. 3, a plurality of antennas 1110*a* to 1110*d* may be arranged in the electronic device 100 or on a front surface of the electronic device 100. In this regard, the plurality of antennas 1110*a* to 1110*d* may be implemented in a form printed on a carrier inside the electronic device or may be implemented in a form of system-on-chip (Soc) together with an RFIC. The plurality of antennas 1110*a* to 1110*d* may be disposed on the front surface of the electronic device in addition to the inside of the electronic device. Here, the plurality of antennas 1110*a* to 1110*d* disposed on the front surface of the electronic device 100 may be implemented as transparent antennas embedded in the display.

A plurality of antennas 1110S1 and 1110S2 may also be disposed on side surfaces of the electronic device 100. In this regard, 4G antennas in the form of conductive members may be disposed on the side surfaces of the electronic device 100, slots may be formed in conductive member regions such that the plurality of antennas 1110*a* to 1110*d* can radiate 5G signals through the slots. Antennas 1150B may additionally be disposed on the rear surface of the electronic device 100 to radiate 5G signals rearward.

In some examples, at least one signal may be transmitted or received through the plurality of antennas 1110S1 and 1110S2 on the side surfaces of the electronic device 100. In some examples, at least one signal may be transmitted or received through the plurality of antennas 1110*a* to 1110*d*, 1150B, 1110S1, and 1110S2 on the front surface and/or the side surfaces of the electronic device 100. The electronic device may perform communication with a base station through any one of the plurality of antennas 1110*a* to 1110*d*, 1150B, 1110S1, and 1110S2. Alternatively, the electronic device may perform MIMO communication with a base station through two or more antennas among the plurality of antennas 1110*a* to 1110*d*, 1150B, 1110S1, 1110S2.

Figure 3B:
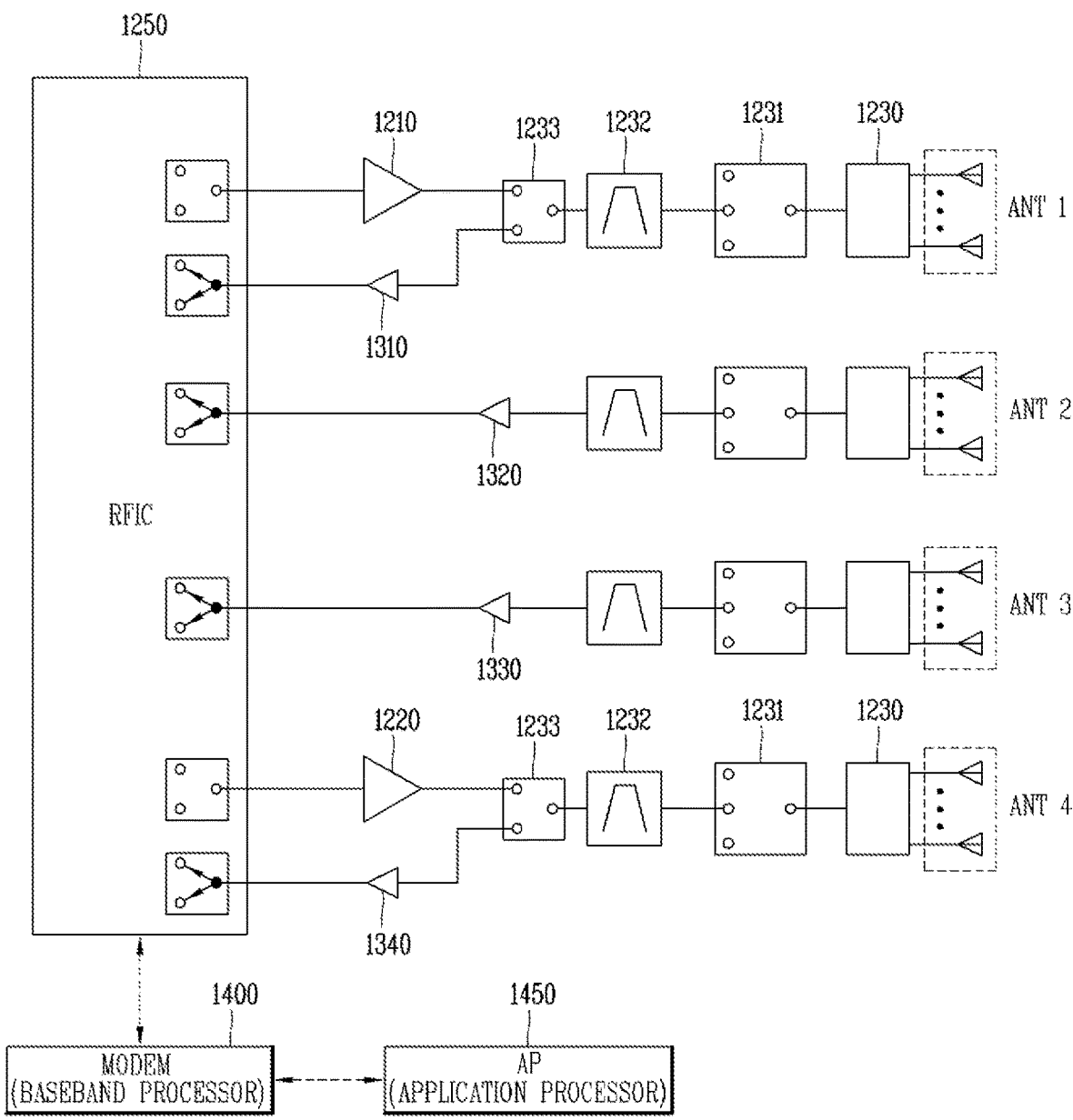
FIG. 3B is a diagram illustrating a configuration of a wireless communication module of an electronic device operable in a 5G communication system according to an implementation.

FIG. 3B is a diagram illustrating a configuration of a wireless communication module of an electronic device operable in a 5G communication system according to an implementation. Referring to FIG. 3B, the electronic device may include a first power amplifier 1210, a second power amplifier 1220, and an RFIC 1250. In addition, the electronic device may further include a modem 1400 and an application processor (AP) 1450. Here, the modem 1400 and the application processor (AP) 1450 may be physically implemented on a single chip, and may be implemented in a logically and functionally separated form. However, the modem 1400 and the AP 1450 are not limited thereto and may be realized in the form of chips that are separated physically from each other, depending on application.

Meanwhile, the electronic device includes a plurality of low noise amplifiers (LNAs) 410 to 440 in the receiver. Here, the first power amplifier 1210, the second power amplifier 1220, the RFIC 1250, and the plurality of low noise amplifiers 1310 to 1340 are all operable in a first communication system and a second communication system. In this case, the first communication system and the second communication system may be a 4G communication system and a 5G communication system, respectively, but may not limited thereto.

As illustrated in FIG. 3B, the RFIC 1250 may be configured as a 4G/5G integrated type, but the present disclosure may not be limited thereto. The RFIC 250 may be configured as a 4G/5G separate type according to an application. When the RFIC 1250 is integrally configured to serve for 4G and 5G, this configuration may be advantageous in terms of synchronization between 4G and 5G circuits as well as simplification of control signaling by the modem 1400.

On the other hand, when the RFIC 1250 is separable into two parts for 4G and 5G, respectively, these two parts may be referred to as a 4G RFIC and a 5G RFIC, respectively. In particular, when there is a great difference between the 5G band and the 4G band, such as when the 5G band is configured as a millimeter wave band, the RFIC 1250 may be configured to be separable into two parts for 4G and 5G, respectively. As such, when the RFIC 1250 is configured as the 4G/5G separate type, there may be an advantage that the RF characteristics can be optimized for each of the 4G band and the 5G band.

Meanwhile, even when the RFIC 1250 is configured as a 4G/5G separation type, the 4G RFIC and the 5G RFIC may be logically and functionally separated but physically implemented on a single chip.

On the other hand, the application processor (AP) 1450 may be configured to control the operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may operate power circuits of a transmitter and a receiver through the RFIC 1250 in a low power mode.

In this regard, when it is determined that the electronic device is in an idle mode, the application processor (AP) 1450 may control the RFIC 1250 through the modem 300 as follows. For example, when the electronic device is in an idle mode, the application processor 280 may control the RFIC 1250 through the modem 400, such that at least one of the first and second power amplifiers 110 and 120 operates in the low power mode or is turned off.

According to another implementation, the application processor (AP) 1450 may control the modem 300 to enable wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, even though a throughput is slightly sacrificed, the application processor (AP) 1450 may control the modem 1400 and the RFIC 1250 to perform short-range communication using only the short-range communication module 113.

According to another implementation, when a remaining battery capacity of the electronic device is equal to or greater than a threshold value, the application processor 1450 may control the modem 300 to select an optimal wireless interface. For example, the application processor (AP) 1450 may control the modem 1400 to receive data through both the 4G base station and the 5G base station according to the remaining battery capacity and the available radio resource information. In this case, the application processor (AP) 1450 may receive the remaining battery capacity information from the PMIC and the available radio resource information from the modem 1400. Accordingly, when the remaining battery capacity and the available radio resources are sufficient, the application processor (AP) 1450 may control the modem 1400 and the RFIC 1250 to receive data through both the 4G base station and 5G base station.

Meanwhile, in a multi-transceiving system of FIG. 3B, a transmitter and a receiver of each radio system may be integrated into a single transceiver. Accordingly, a circuit portion for integrating two types of system signals may be removed from an RF front-end.

In addition, since the front-end component can be controlled by the integrated transceiver, the front-end component can be more efficiently integrated than a case where the transceiving system is separated for each communication system.

In addition, when separated for each communication system, different communication systems cannot be controlled as needed, or because this may lead to a system delay, resources cannot be efficiently allocated. On the other hand, in the multi-transceiving system as illustrated in FIG. 2, different communication systems can be controlled as needed, system delay can be minimized, and resources can be efficiently allocated.

Meanwhile, the first power amplifier 1210 and the second power amplifier 1220 may operate in at least one of the first and second communication systems. In this regard, when the 5G communication system operates in the 4G band or the Sub-6 band, the first and second power amplifiers 1210 and 1220 can operate in both the first and second communication systems.

On the other hand, when the 5G communication system operates in the millimeter wave (mmWave) band, one of the first and second power amplifiers 1210 and 1220 may operate in the 4G band and the other may operate in the millimeter-wave band.

On the other hand, two different wireless communication systems may be implemented with one antenna using an antenna that serves for both transmission and reception by integrating a transmission unit and a reception unit. In this case, 4×4 MIMO may be implemented using four antennas as illustrated in FIG. 2. At this time, 4×4 DL MIMO may be performed through downlink (DL).

Meanwhile, when the 5G band is a Sub 6 band, first to fourth antennas ANT1 to ANT4 may be configured to operate in both the 4G band and the 5G band. On the contrary, when the 5G band is the millimeter wave (mm-Wave) band, the first to fourth antennas ANT1 to ANT4 may be configured to operate in one of the 4G band and the 5G band. In this case, when the 5G band is the millimeter wave (mmWave) band, each of the plurality of antennas may be configured as an array antenna in the millimeter wave band.

Meanwhile, 2×2 MIMO may be implemented using two antennas connected to the first power amplifier 1210 and the second power amplifier 1220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented by 1 Tx, only one of the first and second power amplifiers 1210 and 1220 need to operate in the 5G band. Meanwhile, when the 5G communication system is implemented by 4 Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is embedded in RFIC corresponding to the RFIC 1250. Accordingly, a separate component does not need to be placed outside, thereby improving component mounting performance. In detail, a transmitter (TX) of two different communication systems can be selected by using a single pole double throw (SPDT) type switch provided in the RFIC corresponding to the controller 1250.

In addition, the electronic device capable of operating in a plurality of wireless communication systems according to an implementation may further include a phase controller 1230, a duplexer 1231, a filter 1232, and a switch 1233.

In a frequency band such as a mmWave band, the electronic device needs to use a directional beam to secure coverage for communication with a base station. To this end, each of the antennas ANT1 to ANT4 needs to be implemented as an array antenna ANT1 to ANT4 including a plurality of antenna elements. Specifically, the phase controller 1230 may control a phase of a signal applied to each antenna element of each of the array antennas ANT1 to ANT4. Specifically, the phase controller 1230 may control both magnitude and phase of a signal applied to each antenna element of each of the array antennas ANT1 to ANT4. Since the phase controller 1230 controls both the magnitude and the phase of the signal, it may be referred to as a power and phase controller 230.

Therefore, by controlling the phase of the signal applied to each antenna element of each of the array antennas ANT1 to ANT4, beam-forming can be independently performed through each of the array antennas ANT1 to ANT4. In this regard, multi-input/multi-output (MIMO) may be performed through each of the array antennas ANT1 to ANT4. In this case, the phase controller 1230 may control the phase of the signal applied to each antenna element so that each of the array antennas ANT1 to ANT4 can form beams in different directions.

The duplexer 1231 may be configured to separate signals into a signal in a transmission band and a signal in a reception band. In this case, the signals in the transmission band that are transmitted through the first and second power amplifiers 1210 and 1220 are applied to the first and fourth antennas ANT1 and ANT4, respectively, through a first output port of the duplexer 1231. On the contrary, signals in a reception band received through the antennas ANT1 and ANT4 are received by the low noise amplifiers 310 and 340 through a second output port of the duplexer 1231.

The filter 1232 may be configured to allow a signal in the transmission band or the reception band to pass through and to block a signal in a band other than the transmission band and the reception band. In this case, the filter 1232 may include a transmission filter connected to the first output port of the duplexer 1231 and a reception filter connected to the second output port of the duplexer 1231. Alternatively, the filter 1232 may be configured to pass only the signal in the transmission band or only the signal in the reception band according to a control signal.

The switch 1233 may be configured to transmit only one of a transmission signal and a reception signal. In an implementation of the present disclosure, the switch 1233 may be configured in a single-pole double-throw (SPDT) form to separate the transmission signal and the reception signal in a time division duplex (TDD) scheme. Here, the transmission signal and the reception signal are signals of the same frequency band, and thus the duplexer 1231 may be implemented in the form of a circulator.

Meanwhile, in another implementation of the present disclosure, the switch 1233 may also be applied to a frequency division multiplex (FDD) scheme. In this case, the switch 1233 may be configured in a form of a double-pole double-throw (DPDT) to connect or block the transmission signal and the reception signal, respectively. On the other hand, since the transmission signal and the reception signal can be separated by the duplexer 1231, the switch 1233 may not be necessarily required.

Meanwhile, the electronic device according to the implementation may further include a modem 1400 corresponding to the controller. In this case, the RFIC 1250 and the modem 1400 may be referred to as a first controller (or a first processor) and a second controller (a second processor), respectively. The RFIC 1250 and the modem 1400 may be implemented as physically separated circuits. Alternatively, the RFIC 1250 and the modem 1400 may be logically or functionally distinguished from each other on one physical circuit.

The modem 1400 may perform control and signal processing for signal transmission and reception through different communication systems using the RFID 1250. The modem 1400 may acquire control information from the 4G base station and/or the 5G base station. Here, the control information may be received through a physical downlink control channel (PDCCH), but may not be limited thereto.

The modem 1400 may control the RFIC 1250 to transmit and/or receive signals through the first communication system and/or the second communication system for a specific time interval and from frequency resources. Accordingly, the RFIC 1250 may control transmission circuits including the first and second power amplifiers 1210 and 1220 to transmit a 4G signal or a 5G signal in the specific time interval. In addition, the RFIC 1250 may control reception circuits including the first to fourth low noise amplifiers 1310 to 1340 to receive a 4G signal or a 5G signal at a specific time interval.

Figure 4:
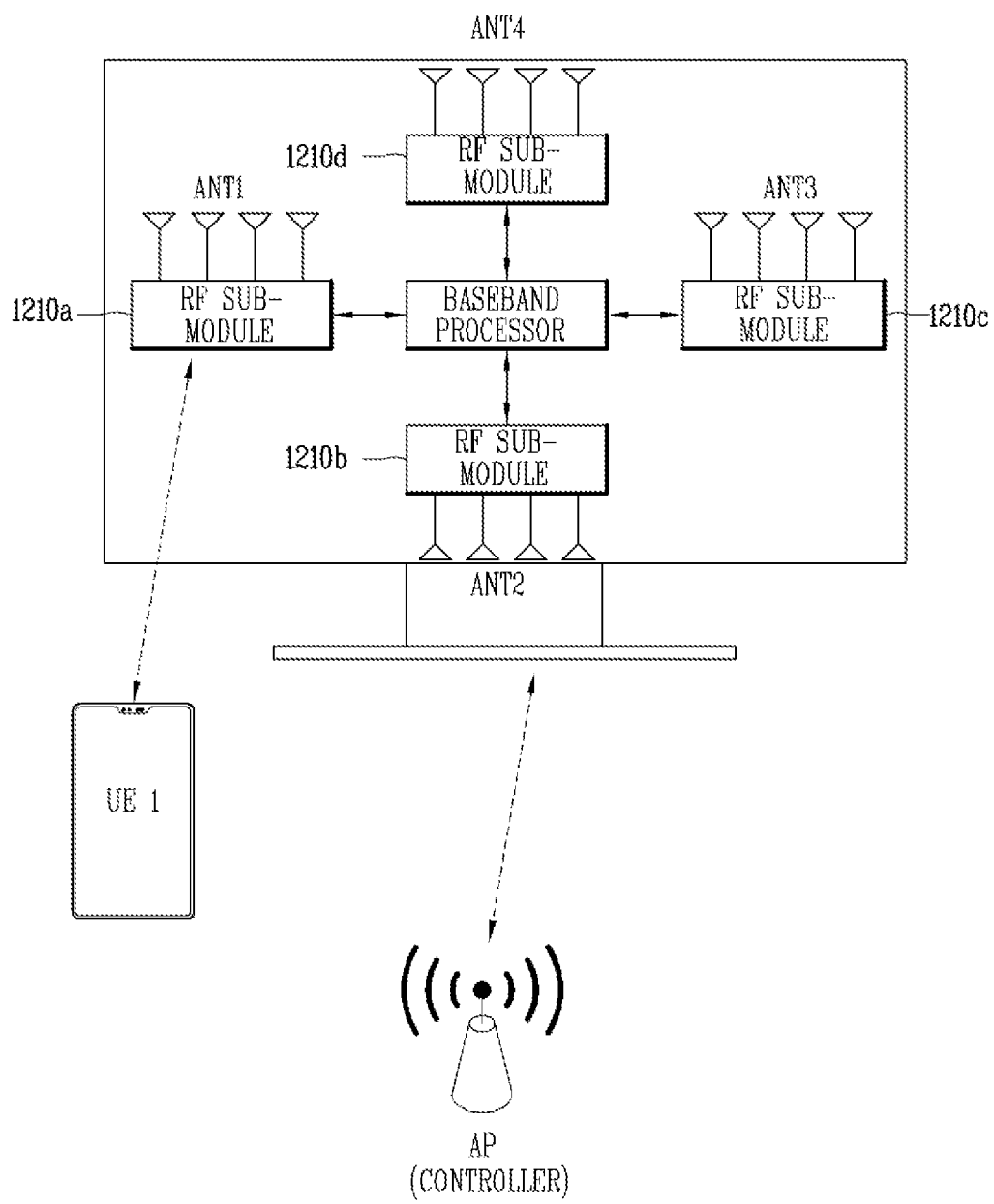
FIG. 4 shows an electronic device with a plurality of antenna modules and a plurality of transceiver circuit modules arranged therein according to an embodiment.

Hereinafter, an electronic device having an array antenna operable in a millimeter-wave band according to the present disclosure will be described. In relation to this, FIG. 4 shows an electronic device with a plurality of antenna modules and a plurality of transceiver circuit modules arranged therein according to an embodiment. Referring to FIG. 4, the electronic device with a plurality of antenna modules and a plurality of transceiver circuit modules arranged therein may be, but not limited to, a television. Thus, the electronic device with a plurality of antenna modules and a plurality of transceiver circuit modules arranged therein may include a certain home electrical appliance or display device that supports a communication service in a millimeter-wave band.

Referring to FIG. 4, an electronic device 1000 includes a plurality of antenna modules ANT1 to ANT4 and a plurality of transceiver circuit modules 1210a to 1210d. In relation to this, the plurality of transceiver circuit modules 1210a to 1210d may correspond to the aforementioned transceiver circuit 1250. Alternatively, the plurality of transceiver circuit modules 1210a to 1210d may be part of the configuration of the transceiver circuit 1250 or part of the configuration of a front end module arranged between the antenna modules and the transceiver circuit 1250.

The plurality of antenna modules ANT1 to ANT4 may be configured into an array antenna with a plurality of antenna elements arranged therein. The number of elements in the antenna modules ANT1 to ANT4 is not limited to 2, 3, 4, etc. as illustrated in the drawings. For example, the number of elements in the antenna modules ANT1 to ANT4 may be increased to 2, 4, 8, 16, etc. Also, the antenna modules ANT1 to ANT4 may have the same number of or a different number of elements. The plurality of antenna modules ANT1 to ANT4 may be disposed in different regions of the display. As in FIG. 16, the plurality of antenna modules ANT1 to ANT4 may be disposed at an upper part, left side, lower part, and right side of the display, but not limited to such an array structure. As another example, the plurality of antenna modules ANT1 to ANT4 may be disposed at a left upper part, right upper part, left lower part, and right lower part of the display.

The antenna modules ANT1 to ANT4 may be configured to send and receive signals in a particular direction in a certain frequency band. For example, the antenna modules ANT1 to ANT4 may operate in either a 28 GHz band, a 39 GHz band, or a 64 GHz band.

The electronic device may maintain a connection with other entities through two or more of the antenna modules ANT1 to ANT4 or perform a data transmission or reception operation for this. In relation to this, an electronic device corresponding to the display device may send or receive data to or from a first entity through the first antenna module ANT1. Also, the electronic device may send or receive data to or from a second entity through the second antenna module ANT2. For example, the electronic device may send or receive data to or from a mobile terminal UE through the first antenna module ANT1. The electronic device may send or receive data to or from a control device such as a set-top box or an access point.

Data may be sent or received to or from other entities through other antenna modules, for example, the third antenna module ANT3 and the fourth antenna module ANT4. As another example, dual connectivity or MIMO may be performed through at least one of the previously connected first and second entities through the third antenna module ANT3 and the fourth antenna module ANT4.

Meanwhile, the transceiver circuit modules 1210a to 1210d may operate to process a transmitted signal and a received signal in an RF frequency band. Here, the RF frequency band a certain frequency band of millimeter waves such as the 28 GHz band, the 39 GHz band, and the 64 GHz band. Meanwhile, the transceiver circuit modules 1210a to 1210d may be referred to as RF SUB-MODULES 1210a to 1210d. In this instance, the number of RF SUB-MODULES 1210a to 1210d is not limited to 4, but may be varied to a certain number, for example, 2 or greater, depending on applications.

Moreover, the RF SUB-MODULEs 1210a to 1210d may have an up-conversion module and a down-conversion module which convert a signal of an RF frequency band into a signal of an IF frequency band or convert a signal of an IF frequency band into a signal of an RF frequency band. To this end, the up-conversion module and the down-conversion module may have a local oscillator (LO) for performing frequency up-conversion and frequency down-conversion.

Meanwhile, as for the RF SUB-MODULEs 1210a to 1210d, a signal may be transmitted from one of the plurality of transceiver circuit modules to a neighboring transceiver circuit module. Accordingly, the transmitted signal may be transmitted at least once to all of the plurality of transceiver circuit modules 1210a to 1210d.

To this end, a data transfer path having a loop structure may be added. In this regard, neighboring RF SUB-MODULES 1210b and 1210c are capable of bidirectional signal transmission through a transmission path P2 having a loop structure.

Alternatively, a data transfer path having a feedback structure may be added. In this regard, at least one SUB-MODULE 1210c is capable of unidirectionally transmitting a signal to the other SUB-MODULEs 1210a, 1210b, and 1210c through the data transfer path having a feedback structure.

The plurality of RF SUB-MODULEs may include first to fourth RF-SUB MODULES 1210a to 1210d. In relation to this, a signal from the first RF SUB-MODULE 1210a may be transmitted to the neighboring second and fourth RF SUB-MODULEs 1210b and 1210d. Also, the second and fourth RF SUB-MODULEs 1210b and 1210d may transmit the signal to the neighboring third RF SUB-MODULE 1210c. In this instance, if bidirectional transmission is possible between the second RF SUB-MODULE 1210b and the third RF SUB-MODULE 1210c as shown in FIG. 4, this may be referred to as a loop structure. On the other hand, if unidirectional transmission is possible between the second RF SUB-MODULE 1210b and the third RF SUB-MODULE 1210c, this may be referred to as a feedback structure. Meanwhile, in the feedback structure, at least two signals may be transmitted to the third RF SUB-MODULE 1210c.

However, the present disclosure is not limited to such a structure, and only some of the first to fourth RF sub-modules 1210a to 1210d may have a baseband module depending on applications. Alternatively, the baseband module may not be provided in the first to fourth RF sub-modules 1210a to 1210d, but may be configured as a separate control part, i.e., a baseband processor 1400. For example, control signals may be transmitted only by a separate control part, i.e., the baseband processor 1400.

Meanwhile, as for the electronic device shown in FIGS. 1 to 2B, a concrete configuration and functions of an electronic device having a wireless interface as in FIGS. 3B and 4 will be described below. Data needs to be transmitted or received between electronic devices by using a communication service of an mmWave band between the electronic devices. In relation to this, a wireless AV (audio-video) service may be provided using a 5G communication service.

A problem with delivering images at a resolution of 4K or more as described above is that there is no concrete solution for an antenna and an RFIC (radio frequency integrated chip) which provide a wireless interface in an electronic device such as an image display device. In particular, wireless AV data needs to be sent to or received from other electronic devices, considering that an electronic device such as an image display device is placed on a wall in a building or on a table. To this end, it is necessary to propose a concrete configuration and an antenna structure regarding in which part of the image display device the antenna and the RFIC are placed.

Figure 5A:
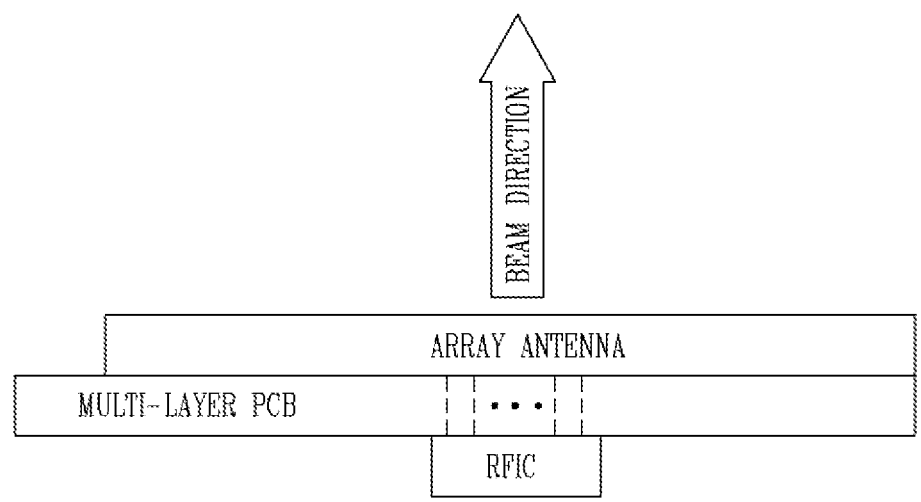
FIG. 5A shows an AIP (antenna-in-package) module structure and an antenna module structure implemented on a flexible substrate.
Figure 5A:
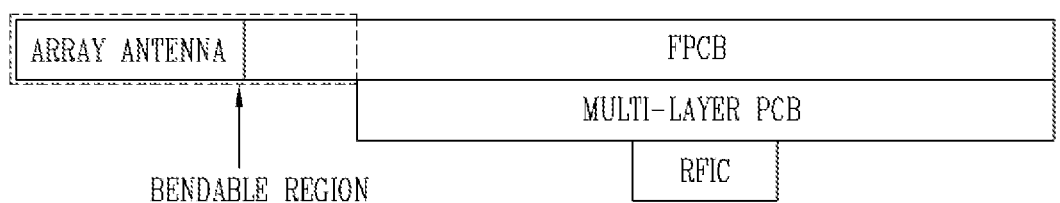

In relation to this, FIG. 5A shows an AIP (antenna-in-package) module structure and an antenna module structure implemented on a flexible substrate. Referring to (a) of FIG. 5A, the AIP (antenna-in-package) module is configured as a combination of RFIC, PCB, and antenna for mmWave band communication. As illustrated in (a) of FIG. 5A, the AIP module may have an array antenna disposed on the same PCB in order to minimize the distance between the RFIC and the antenna. The antennas in the AIP module may be implemented in a multi-layer PCB manufacturing process, and may radiate a signal in a vertical/lateral direction of the PCB. Meanwhile, dual polarization may be implemented using a patch antenna and a dipole/monopole antenna. On the other hand, referring to (b) of FIG. 5A, the antenna module structure implemented on the flexible substrate may have an array antenna structure implemented in one side region of the FPCB.

The flexible substrate may be made of one of COP (Cyclo Olefin Polymer, transparent), PET (polyethylene terephthalate, transparent), PI (Polyimide, transparent/opaque), MPI (Modified Polyimide, opaque), and PPS (Polyphenylene Sulfide, opaque).

Figure 5B:
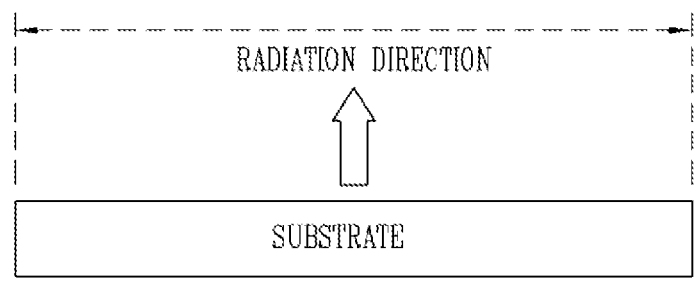
FIG. 5B is a conceptual diagram showing antenna structures with different radiation directions.
Figure 5B:
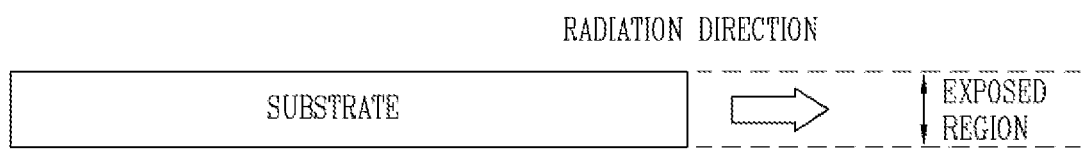

Meanwhile, FIG. 5B is a conceptual diagram showing antenna structures with different radiation directions. Referring to (a) of FIG. 5A and (a) of FIG. 5B, the antenna radiation direction of the AIP module is a forward direction. In this regard, the antennas disposed in the AIP module may be composed of radiating elements such as a patch antenna. That is, the antennas disposed in the AIP module may be broadside antenna elements which radiate in a broadside direction.

In relation to this, the broadside radiation may be implemented by an antenna that radiates in a direction perpendicular to the substrate. Such a broadside antenna may be a patch antenna or a reflector dipole/monopole antenna. In an mmWave band, it is assumed that it is used in an LOS environment, and a radiation surface of the antenna may be an exposed portion of the antenna. Circuit parts such as RFIC may be mounted on a lower end of the substrate because of a large loss of a transmission line in the mmWave band. In a 60 GHz band, the exposed area of the antenna module may be increased to problems such as part size rather than antenna size.

On the other hand, referring to (b) of FIG. 5A and (b) of FIG. 5B, the radiation direction of the antenna module implemented on the flexible substrate corresponds to a lateral direction. In this regard, the antennas implemented on the flexible substrate may be composed of radiating elements such as dipole/monopole antennas. That is, the antennas implemented on the flexible substrate may be end-fire antenna elements.

In relation to this, end-fire radiation may be implemented by an antenna that radiates in a direction horizontal to the substrate. Such an end-fire antenna may be implemented as a dipole/monopole antenna, a Yagi-dipole antenna, a Vivaldi antenna, a SIW horn antenna, or the like. In this regard, the Yagi-dipole antenna and the Vivaldi antenna have horizontal polarization characteristics. Meanwhile, one of the antenna modules disposed in the image display device proposed in the present disclosure require a vertical polarized antenna. Thus, there is a need to propose an antenna structure that can minimize the exposed area of the antenna while operating as a vertical polarized antenna.

Figure 6:
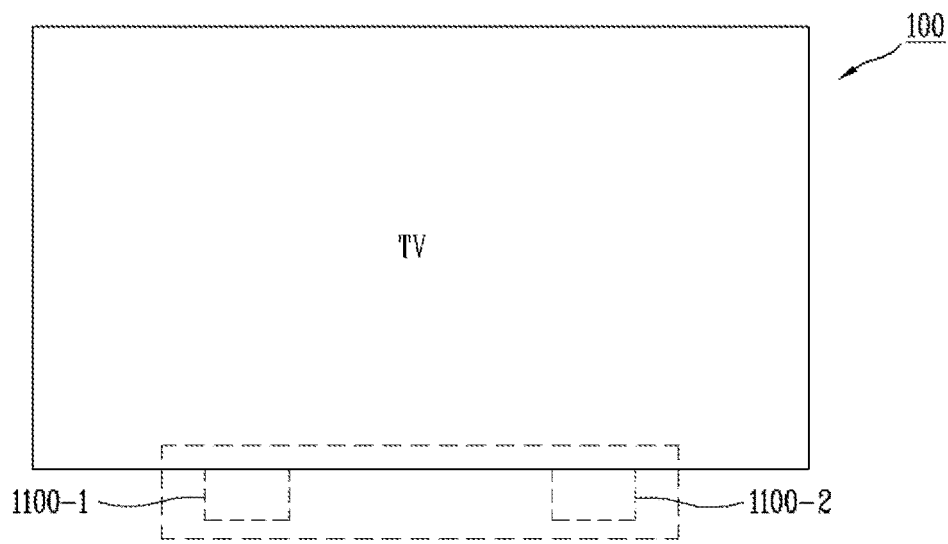
FIG. 6 is a conceptual diagram of a plurality of communication modules disposed at a lower portion of an image display device and how these communication modules are configured and communicate with another communication module disposed at the front.
Figure 6:
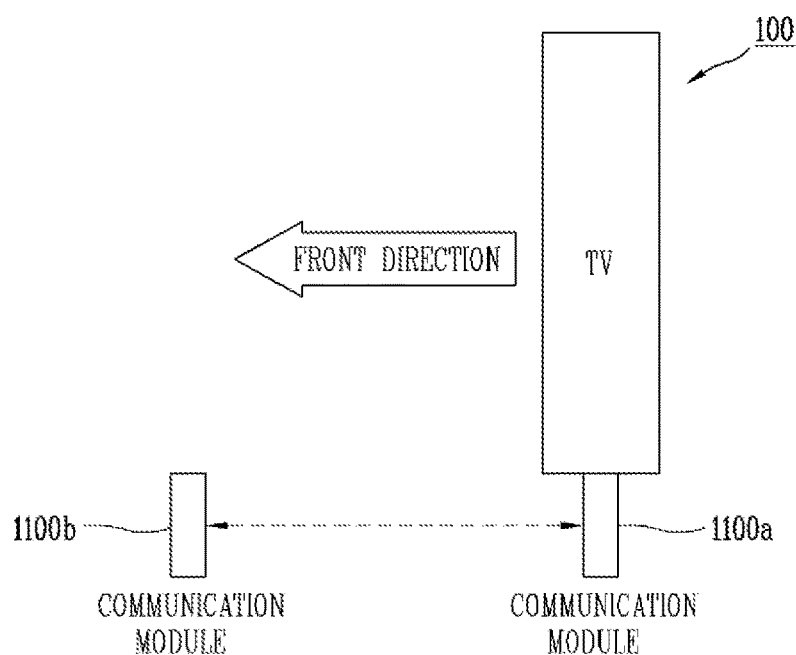

In a case where the AIP module is disposed at a lower portion of an electronic device such as an image display device, it needs to communicate with another communication module disposed at the front. In relation to this, FIG. 6 is a conceptual diagram of a plurality of communication modules disposed at a lower portion of an image display device and how these communication modules are configured and communicate with another communication module disposed at the front. Referring to (a) of FIG. 6, different communication modules 1100-1 and 1100-2 may be disposed at a lower portion of an image display device 100. Referring to (b) of FIG. 6, a communication module disposed at a lower portion of the image display device 100, that is, an antenna module 1100, may communicate with the communication module 1100b disposed at the front.

Accordingly, when performing communication with the communication module 1100-2 disposed at the front of the image display device 100, the AIP module may be exposed to the front. Such an array structure of an antenna module may cause impairment of the design of the image display device. In this regard, design should be taken into account as one of the important factors in the selection of a product such as an image display device, as well as the performance of communication between the image display device and other communication modules.

Moreover, the antenna module structure implemented on the flexible substrate as shown in (b) of FIG. 5B may have a low-profile. On the other hand, in the AIP module structure shown in (a) of FIG. 5A, the antenna height may be increased depending on the RFIC driving circuit and the heat dissipation structure. Also, in the AIP module structure shown in (a) of FIG. 5A, the antenna height may be increased depending on the antenna type.

Figure 7:
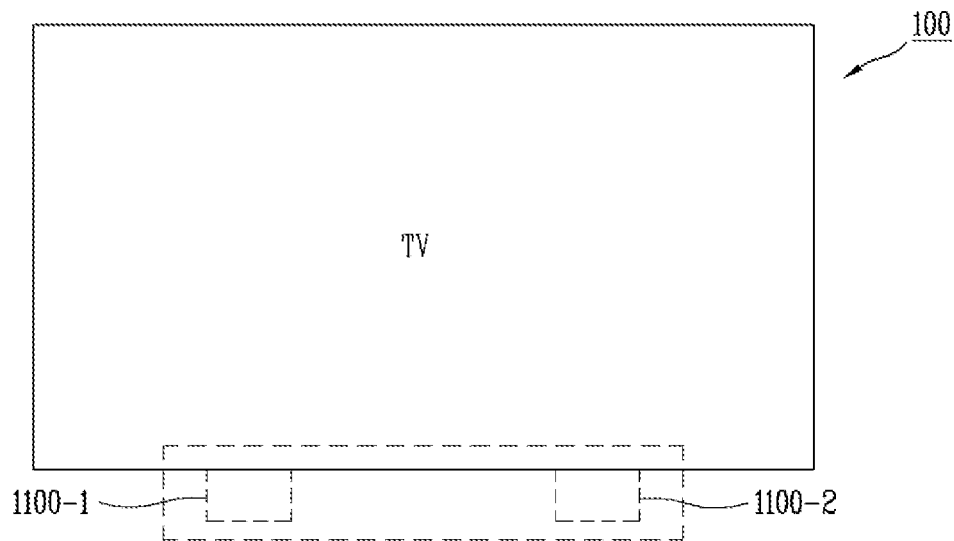
FIG. 7 shows a structure of antenna modules disposed at a lower portion of an image display device according to an embodiment.
Figure 7:
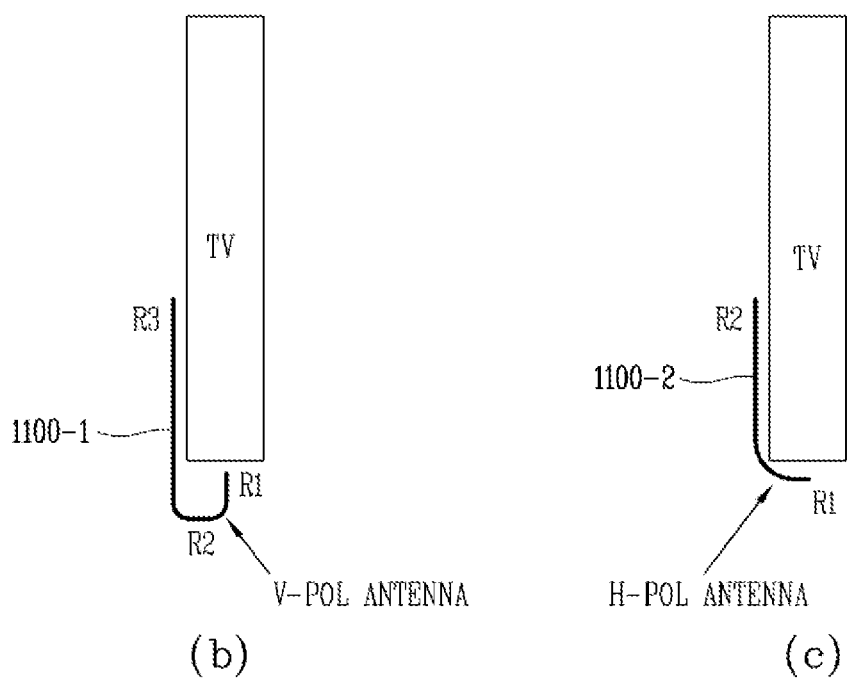

As described above, the antenna module 1100 implemented on the flexible substrate that may have a low-profile may be configured as shown in FIG. 7. In relation to this, a broadband dual-polarized antenna is required for high-speed, large-volume data transmission and reception in an mmWave band. Also, the broadband dual-polarized antenna needs to be formed in a low-profile antenna structure that is very short in height, so as to be applied to an electronic product. In relation to this, there are limitations in forming a vertical polarized antenna having a low-profile antenna height due to its structural characteristics. Accordingly, the present disclosure proposes a low-profile, mmWave-band antenna structure which is suitable for an mmWave communication environment and can achieve dual polarization.

In relation to this, an antenna module implemented on a flexible substrate disclosed in the present disclosure has the following technical features.

To send or receive high-speed, large-volume data in an mmWave band, two or more MIMO antenna modules having orthogonal polarization characteristics are required. In the mmWave band, an array antenna is used in order to make up for a high free space loss due to high frequency band characteristics.

An mmWave antenna implemented by a flexible film has the following restrictions. In an application that requires a slim structure, it may not be easy in terms of configuration to dispose an antenna with dual polarization characteristics in an electronic device. In relation to this, there may be issues with antenna bandwidth when a dual-polarized antenna is implemented as a patch antenna having a low profile.

Accordingly, candidates for an array antenna which may be made of a flexible film material may include Yagi-dipole, Vivaldi, and slot antennas. However, the Yagi-dipole/Vivaldi antennas have the same polarization characteristics as end-fire radiation characteristics. Thus, the present disclosure proposes a slot array antenna which can have a low profile as a vertical polarized antenna.

Such a slot array antenna is a low-profile, and may be implemented using a flexible substrate. Meanwhile, the slot array antenna has orthogonal polarization characteristics with respect to a horizontal polarized antenna such as a dipole antenna, and may have a slim, low profile. Meanwhile, due to the bidirectional beam characteristics of the slot antenna, a reflector or a director may be required in order to direct a beam in one direction. However, no additional reflector structure is required in accordance with the best mode of an antenna configuration proposed in the present disclosure, and the present disclosure may suggest a vertical polarized antenna that can direct a beam in one direction based on the flexibility of films.

FIG. 7 shows a structure of antenna modules disposed at a lower portion of an image display device according to an embodiment. Referring to (a) of FIG. 7, an antenna module 1100 may include a vertical polarized antenna module 1100-1 and/or a horizontal polarized antenna module 1100-2. In relation to this, the vertical polarized antenna module 1100-1 and/or the horizontal polarized antenna module 1100-2 may be referred to as a first antenna module 1100-1 and a second antenna module 1100-2, respectively. As such, the vertical polarized antenna module 1100-1 and the horizontal polarized antenna module 1100-2 are not limited to vertical polarization and horizontal polarization. Thus, the vertical polarized antenna module 1100-1 and the horizontal polarized antenna module 1100-2 may be certain antenna modules orthogonal to each other that radiate a signal of a certain polarization.

Referring to (b) of FIG. 7, a vertical polarized antenna of the vertical polarized antenna module 1100-1 may be disposed in a first region R1 of a flexible substrate (FPCB). Thus, the first antenna module 1100-1 may radiate a vertically polarized signal toward the front surface of the electronic device. In a case where such a vertical polarized antenna module is applied to an image display device, only a portion corresponding to the antenna part is exposed. Accordingly, an antenna module structure implemented on a flexible substrate allows the image display device to have less exposed area, compared to an AIP antenna module structure. In this regard, the exposed area of the antenna module implemented on the flexible substrate may be approximately one wavelength of the operating frequency.

For example, the height at which the antenna module is exposed at 60 GHz may be around 5 mm, including a cover of the structure.

Meanwhile, referring to (c) of FIG. 7, a horizontal polarized antenna of the horizontal polarized antenna module 1100-2 may be disposed in a first region R1 of a second flexible substrate (FPCB2). Thus, the second antenna module 1100-2 may radiate a horizontally polarized signal toward the front surface of the electronic device.

In relation to this, MIMO or dual connectivity (DC) configuration may be performed with a contiguous set-top box and/or another electronic device by using both the first antenna module 1100-1 and the second antenna module 1100-2. Thus, the image display device has to use the first antenna module 1100-1 and the second antenna module 1100-2 simultaneously. In relation to this, the image display device, unlike a mobile terminal, has enough space for the different antenna modules. Accordingly, MIMO and/or DC configuration may be provided through a plurality of antenna modules using different polarizations, rather than a single antenna module of dual feed type. By providing MIMO and/or DC configuration through a plurality of antenna modules using different polarizations, the level of interference between different polarized signals may be reduced. In particular, the level of interference between different polarized signals may be further reduced by using different types of antennas.

Figure 8A:
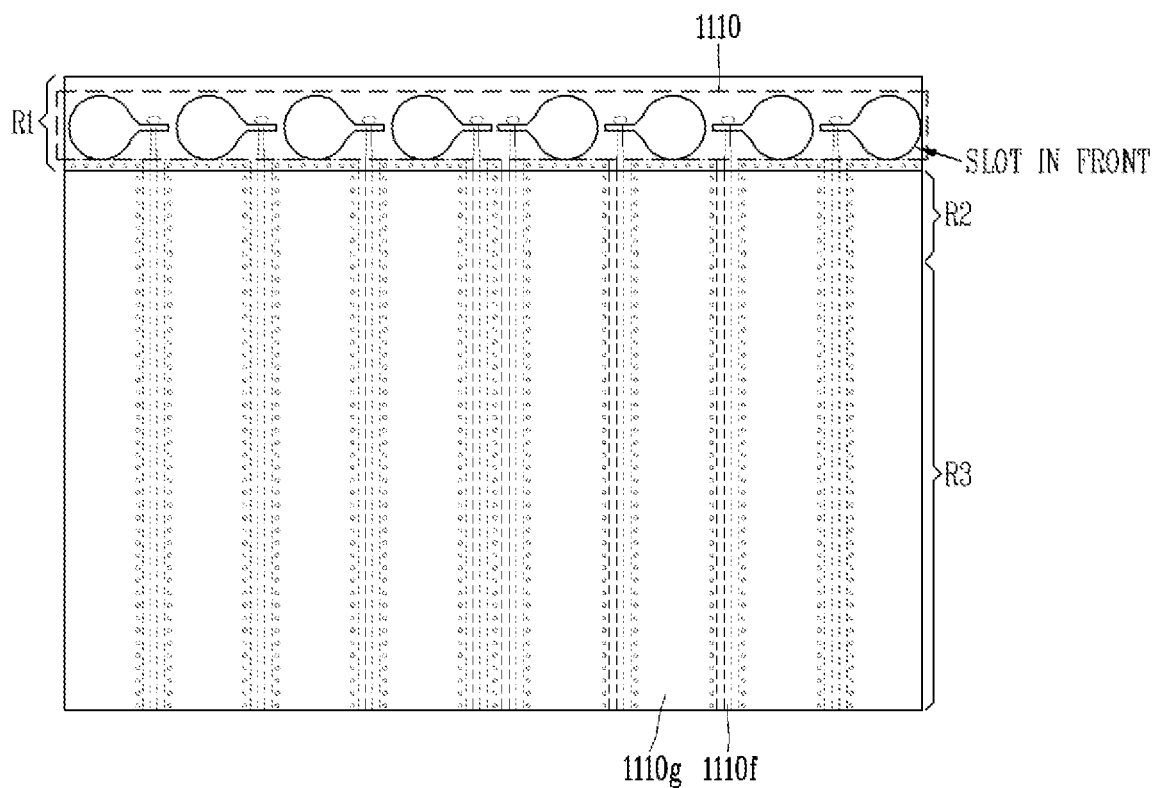
FIG. 8A shows a slot array antenna structure according to an embodiment.
Figure 8A:
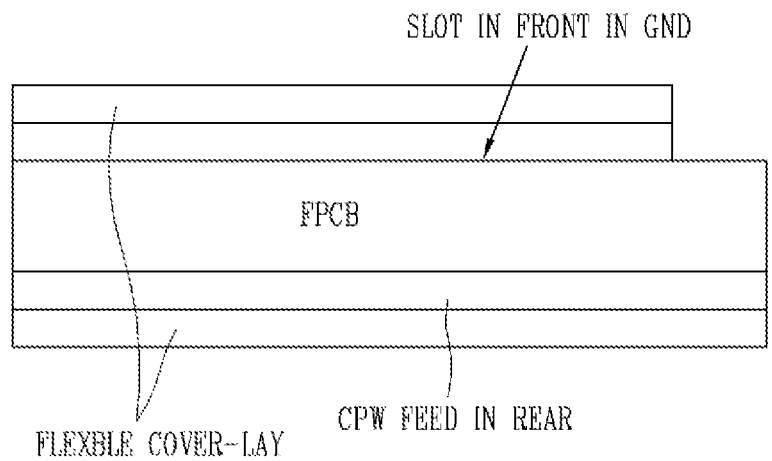

Meanwhile, in the present disclosure, a slot array antenna may be used as the vertical polarized antenna. FIG. 8A shows a slot array antenna structure according to an embodiment. Referring to FIG. 8A, a slot array antenna 1110 with a plurality of slot radiating elements arranged therein may be formed on a front side of a flexible substrate. Meanwhile, a ground pattern 1110g may be formed in the other parts of the flexible substrate other than the first region R1 where the slot array antenna 1110 is disposed.

Accordingly, the slot array antenna structure proposed in the present disclosure may be a slot antenna having a coupled feeding structure. In relation to this, the coupled feeding structure may be formed of a combination of a transmission line feeding structure and a radiator non-contact feeding structure. The slot array antenna 1100 may include a plurality of slot radiating elements formed on a ground surface opposite a transmission line corresponding to a feeding portion 1110f. In this regard, the direction of an electric field formed in the plurality of slot radiating elements may be consistent with the direction of a signal line corresponding to the feeding portion 1110f. Accordingly, each of the slot radiating elements of the slot array antenna 1100 may be configured to radiate a vertically polarized signal.

Referring to FIGS. 5 to 8A, the electronic device 100 corresponding to the image display device may include a display 151 and an antenna module 1100. The display 151 is formed on a front surface of the electronic device 100 and configured to show information on a screen. The antenna module 1100 may be disposed at a lower portion of the electronic device and configured to radiate a vertically polarized signal toward the front surface of the electronic device. The antenna module 1100 may further include a second antenna module 1100-2 so as to radiate a horizontally polarized signal to the front surface of the electronic device.

The antenna module 1100 may include a slot array antenna 1100 and a feeding portion 1110f. The slot array antenna 1110 may be disposed in a first region of a flexible substrate so as to radiate a vertically polarized signal in a millimeter-wave band. As illustrated in (b) of FIG. 7, the first region may be a part of the flexible substrate directed toward the front surface of the electronic device.

The feeding portion 1110f may be composed of a transmission line so as to apply a signal to each of slot radiating elements of the slot array antenna 1110. The feeding portion 1110f may be disposed on a rear side of the flexible substrate, and a signal from an end of the feeding portion 1110f may be radiated toward a front side of the flexible substrate.

The feeding portion 1110f may be formed of a coplanar waveguide (CPW) structure which has a ground region disposed on opposite sides of a signal line in order to reduce signal loss in a millimeter-wave band. A plurality of vias may be disposed in the ground region of the CPW structure and electrically connected to the ground region disposed on the rear side of the flexible substrate. The feeding portion 1110f may be disposed in a second region R2 bent from the first region R1 and a third region R3 bent from the second region R2. Also, an end of the feeding portion 1110f may be formed in the first region and radiate a signal by coupling by a slot radiating element. In this regard, the first region R1 and third region R3 of the flexible substrate may correspond to a front region and rear region of the electronic device.

Figure 8B:
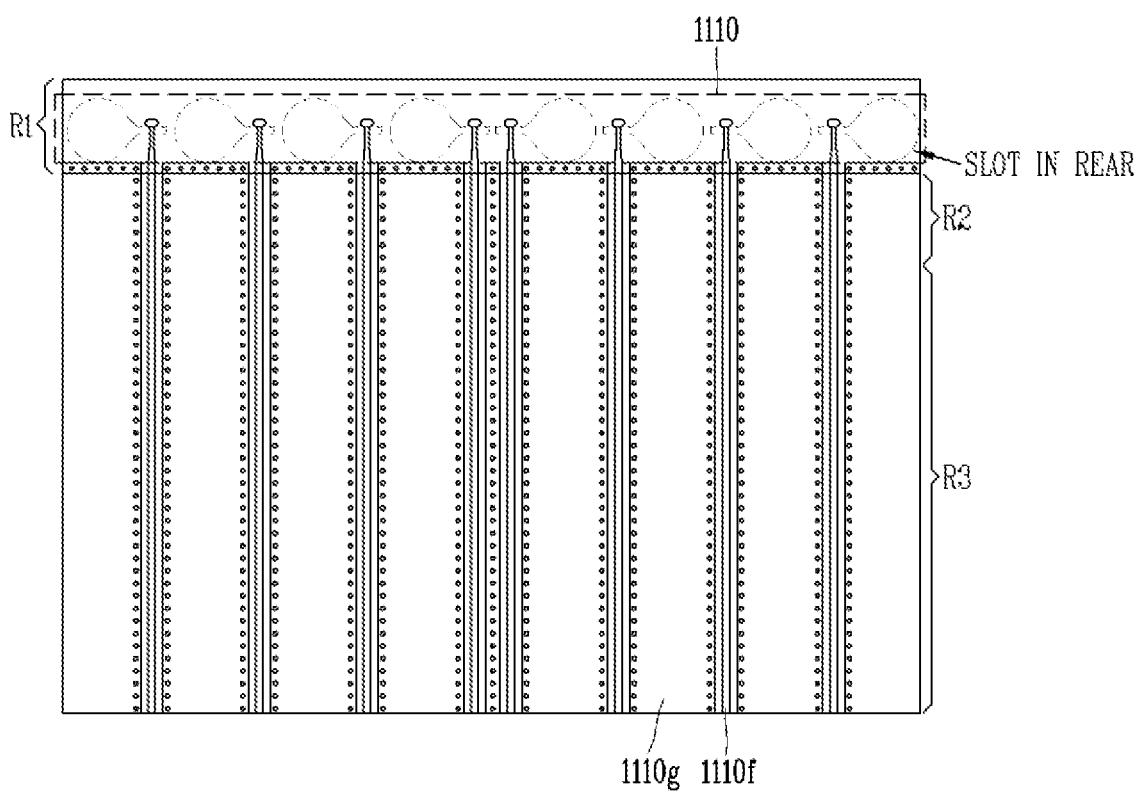
FIG. 8B shows a slot array antenna structure according to another embodiment.
Figure 8B:
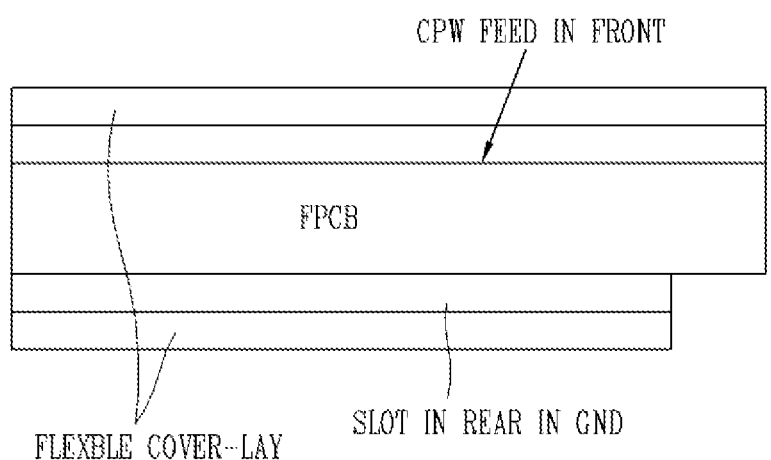

According to another embodiment, a slot array antenna and a ground may be disposed on a rear side of a flexible substrate, and a feeding portion may be formed on a front side of the flexible substrate. In this regard, FIG. 8B shows a slot array antenna structure according to another embodiment. Referring to FIG. 8B, a slot array antenna 1110b with a plurality of slot radiating elements arranged therein may be formed on the rear side of the flexible substrate. Meanwhile, a ground pattern 1110g may be formed in the other parts other than the first region R1 where the slot array antenna 1110b is disposed.

Referring to FIGS. 5 to 7 and FIG. 8B, the antenna module 1100 may include a slot array antenna 1110b and a feeding portion 1110f. The slot array antenna 1110 may be disposed in a first region of a flexible substrate so as to radiate a vertically polarized signal in a millimeter-wave band. As illustrated in (b) of FIG. 7, the first region may be a part of the flexible substrate directed toward the front surface of the electronic device.

The feeding portion 1110f may be disposed in a second region R2 bent from the first region R1 and a third region R3 bent from the second region R2, so as to apply a signal to each of slot radiating elements of the slot array antenna 1110. The feeding portion 1110f may be disposed on a rear side of the flexible substrate, and a signal from an end of the feeding portion 1110f may be radiated toward a front side of the flexible substrate. In this regard, a signal is radiated toward the rear side through the slot array antenna 1110b formed on the rear side of the flexible substrate. However, the signal is reflected from the ground pattern 1110g formed in the third region R3 and radiated toward the front.

Referring to FIGS. 5 to 8B, the first region R1 of the flexible substrate may be formed above the second region R2 so as to overlap at least part of the third region R3 of the flexible substrate. Accordingly, the flexible substrate formed in the first to third regions R1 to R3 may be formed in a U-shape.

A rear radiation signal radiated to the third region R3 through each slot radiating element of the slot array antenna 1100 may be reflected by a metal pattern formed in the third region R3, that is, the ground pattern 1110g, and radiated to the front region. In the configuration of FIG. 8B, a rear radiation signal radiated to the third region R3 through each slot radiating element of the slot array antenna 1110b may be reflected by a metal pattern formed in the third region R3, that is, a ground region having a CPW structure, and radiated to the front region.

Meanwhile, the distance between front and rear portions of the flexible substrate, that is, the distance between the first and third regions R1 and R3 of the flexible substrate, may be determined within a predetermined range of operation wavelengths of a signal. In this regard, FIG. 9 shows a conceptual diagram showing how phase changes with the distance between an antenna and a metal reflector according to the present disclosure.

Figure 9:
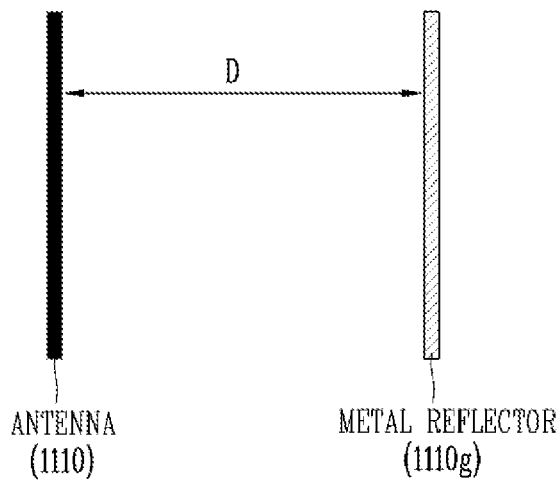
FIG. 9 shows a conceptual diagram showing how phase changes with the distance between an antenna and a metal reflector according to the present disclosure.
Figure 9:
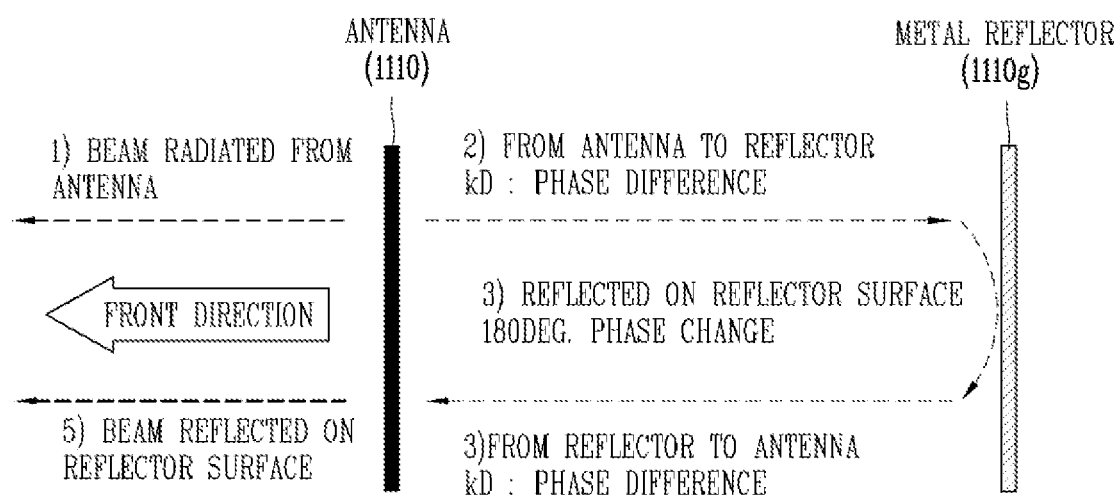

Referring to (a) of FIG. 9, the phase change with the distance between the antenna 1110 and the metal reflector 1110g may be represented by k×D. In relation to this, k is a propagation constant of a medium, which may be represent by 2p/l. Here, l represents the wavelength within the medium filled between the antenna 1110 and the metal reflector 1110g. Meanwhile, c is the speed of light which is $3 \times 10^8$ m/s. F is frequency, Dk is dielectric constant, and Dk in air is 1 (Dk=1). Meanwhile, the reflection coefficient (Γ) of the metal reflector is −1, where the reflection coefficient "1" means total reflection, and the "-" sign means a phase change of 180°. When a signal radiated from the antenna 1110 is reflected from the metal reflector, the signal changes phase by 180 degrees.

Referring to (b) of FIG. 9, the gain of a beam radiated toward the front of the antenna 1110 may be determined by the distance between the antenna 1110 and the metal reflector 1110g. In this regard, the value of total phase change with respect to the distance between the antenna 1110 and the metal reflector 1110g may be represented by 2 kD+180 degrees.

Specifically, if the distance between the antenna 1110 and the metal reflector 1110g is ¼+n½ (n=0, 1, 2, 3, . . . ), a reflection signal is in-phase. Thus, the total phase of a beam reflected from the metal reflector 1110g is (n+1)×360 degrees, which means "in-phase" and therefore allows for beam synthesis, thereby increasing the gain on the front. On the other hand, if the distance between the antenna 1110 and the metal reflector 1110g is ½+n½ (n=0, 1, 2, 3, . . . ), a reflection signal is out-of-phase. Thus, the total phase of a beam reflected from the metal reflector 1110g is 180+(n+1)×360 degrees, which means "out-of-phase", thereby decreasing the gain on the front. In relation to wavelength change with the medium, in a case where a dielectric body (antenna carrier) whose Dk (dielectric constant) is greater than 1 (free space, air) is inserted, the distance between the antenna 1110 and the metal reflector 1110g may be reduced.

Referring to FIGS. 5 to 9, the distance between the first region R1 and third region R3 of the flexible substrate may be determined within a predetermined range of ¼ of the operation wavelength of an mmWave band signal. Here, "¼ of the operation wavelength" means that the distance between the slot array antenna 1110 and 1110b and the ground pattern 1110g is ¼+n½ (n=0, 1, 2, 3, . . . ). Thus, the rear radiation signal radiated to the third region R3 of the flexible substrate where the slot array antenna 1110 and 1110b is formed and a front radiation signal radiated to the first region R1 may be propagated in phase.

Figure 10:
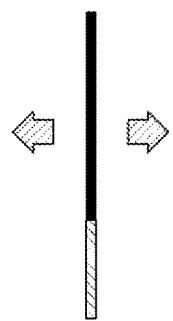
FIG. 10 shows slot antenna structures of various shapes according to the present disclosure.
Figure 10:
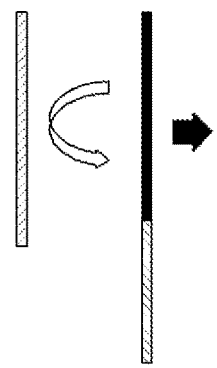
Figure 10:
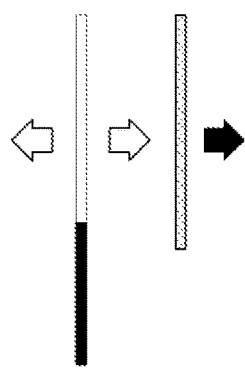
Figure 10:
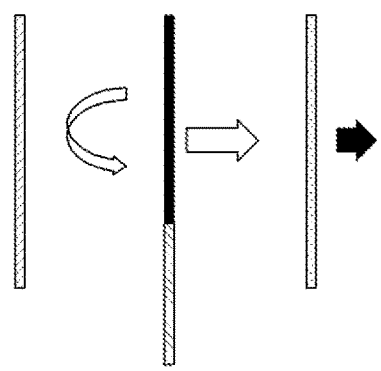
Figure 10:
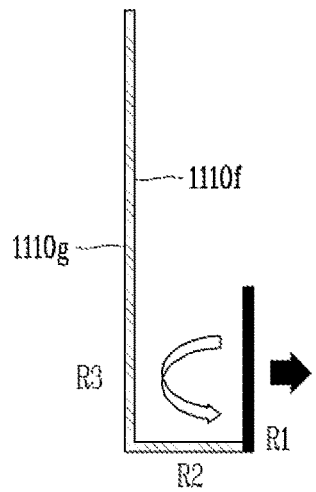
Figure 10:
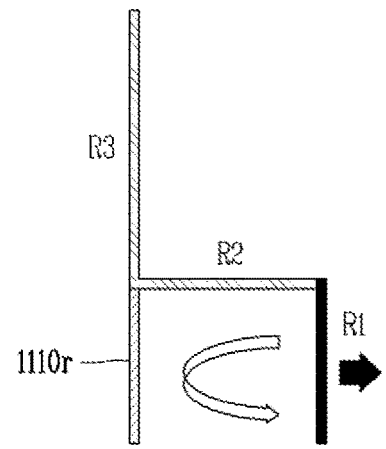

Meanwhile, an antenna module implemented on a flexible substrate disclosed in the present disclosure may be formed in a J-shape as well as a U-shape. In relation to this, FIG. 10 shows slot antenna structures of various shapes according to the present disclosure. In this regard, (a) of FIG. 10 shows a slot antenna and a feeding portion arranged in one plane. Thus, an antenna beam may be distributed in both directions through the slot antenna. Accordingly, an antenna beam may be distributed in both directions by using a slot antenna, without a reflector/director, in an mmWave band. Therefore, the beam may be radiated toward both the front and rear of the electronic device by disposing the slot antenna structure of (a) of FIG. 10 in the electronic device.

Referring to (b) of FIG. 10, the antenna beam may be concentrated in one direction by locating a metal reflector on one side of the slot antenna. Meanwhile, referring to (c) of FIG. 10, the antenna beam may be concentrated in one direction by locating a director on one side of the slot antenna. Also, referring to (d) of FIG. 10, the antenna beam may be concentrated more in one direction by locating a metal reflector on one side of the slot antenna and a director on the other side.

Meanwhile, referring to FIGS. 5 to 9 and (e) of FIG. 10, the flexible substrate may be formed as a bending structure including first to third regions R1 to R3, and the feeding portion 1110f or the ground surface 1110g on the opposite side may be formed as a metal reflector. Thus, the rear radiation signal of the slot array antenna 1100 may be reflected by a ground region near the feeding portion 1110f formed in the third region R3 of the flexible substrate. Accordingly, the rear radiation signal of the slot array antenna 1100 may be in phase with the front radiation signal, thereby increasing the gain of an antenna beam toward the front. That is, the U-shaped antenna structure disclosed in the present disclosure utilizes structural advantages of a dielectric film such as a flexible substrate. Therefore, a bidirectional beam may be concentrated in one direction by bending the FPCB and using the ground region near the feeding portion 1110f as a reflector.

Referring to FIGS. 5 to 9 and (f) of FIG. 10, the first region R1 of the flexible substrate may be formed below the second region R2 so as not to overlap the third region R3 of the flexible substrate. In relation to this, a rear radiation signal radiated to the third region R3 through each slot radiating element of the slot array antenna may be reflected by a reflector 1110r formed in the rear region, apart from the third region R3, and radiated to the first region R1.

In relation to this, the distance between the first region R1 of the flexible substrate and the reflector 1100r may be determined within a predetermined range of ¼ of the operation wavelength of an mmWave band signal. Here, "¼ of the operation wavelength" means that the distance between the slot array antenna 1110 and the ground pattern 1110g is ¼+n½ (n=0, 1, 2, 3, . . . ). Thus, the rear radiation signal radiated to the third region R3 of the flexible substrate where the slot array antenna 1110 and 1110b is formed and a front radiation signal radiated to the first region R1 may be propagated in phase.

Meanwhile, the antenna module 1100 disclosed in the present disclosure may be operably coupled to a transceiver circuit and a processor which are formed on a substrate interfaced with a transparent substrate. The transceiver circuit and the processor may be disposed inside the image display device. In relation to this, FIG. 11 shows a configuration of an antenna module, a transceiver circuit, and a processor which are implemented on a flexible substrate according to the present disclosure.

Figure 11:
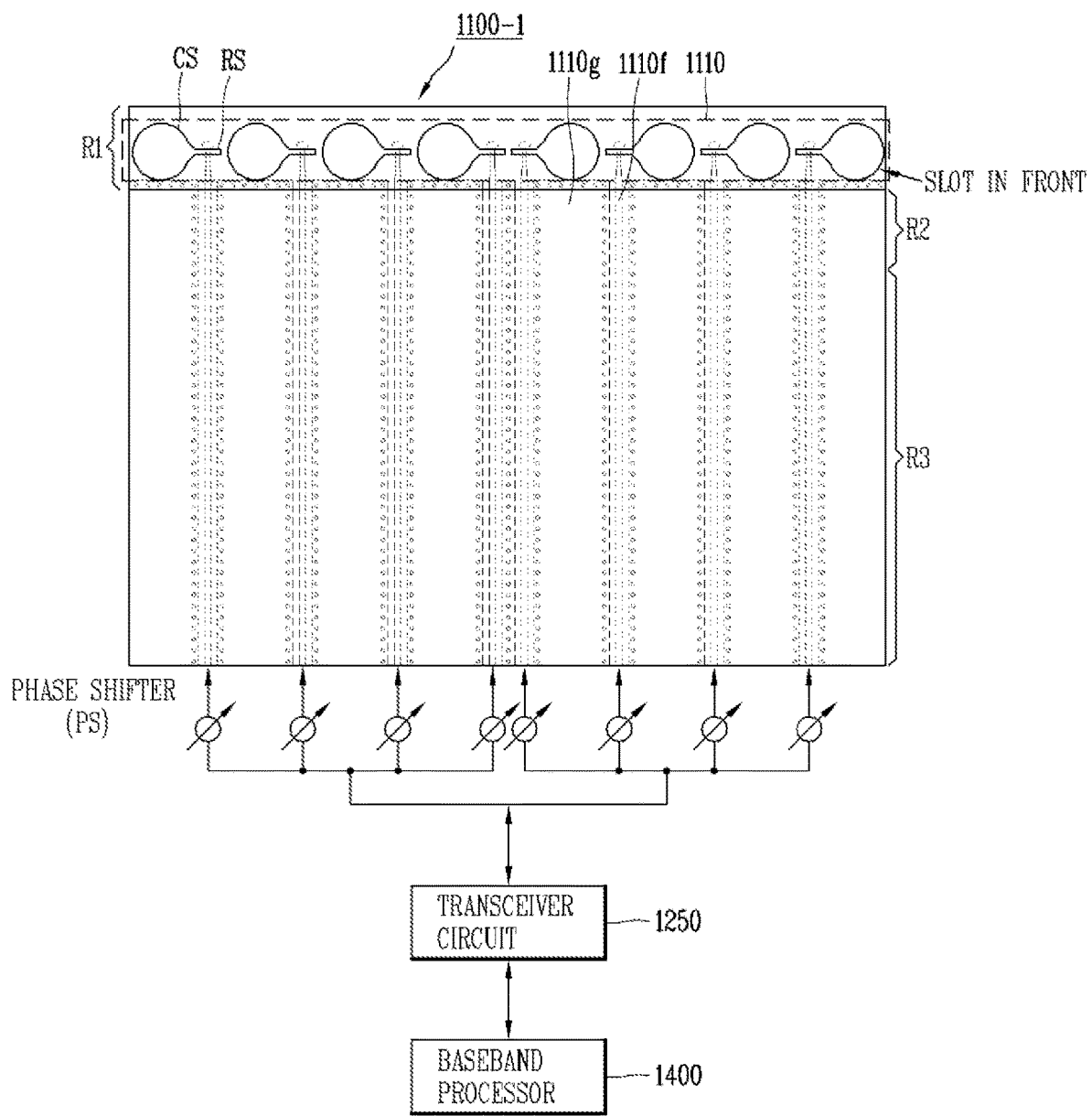
FIG. 11 shows a configuration of an antenna module, a transceiver circuit, and a processor which are implemented on a flexible substrate according to the present disclosure.

Referring to FIG. 5 and FIG. 11, the electronic device 100 may further include a transceiver circuit 1250 and a processor 1400. The transceiver circuit 1250 may be operably coupled to the antenna module 1100. The processor 1400 may be operably coupled to the transceiver circuit 1250 and may be configured to control the transceiver circuit 1250. In this regard, the processor 1400 may be a baseband processor.

However, the processor 1400 is not limited thereto, and may alternatively be any processor that controls the transceiver circuit 1250.

Meanwhile, each of the slot radiating elements constituting the slot array antenna 1110 may be formed of a circular slot CS. A rectangular slot RS connected to an end of each of slot radiating elements may be formed along a horizontal axis so as to be perpendicular to the feeding portion 1110*f*. The feeding portion 1110*f* disposed on a different side from where the slot radiating elements are disposed may be formed along a vertical axis.

A vertically polarized signal of the feeding portion 1110*f* formed along the vertical axis may be coupled through the rectangular slots RS and radiated to each slot radiating element. The processor 1400 may control the transceiver circuit 1250 so that the vertically polarized signal is beam-formed toward the front surface of the electronic device through the circular slots CS connected to the rectangular slots RS. To this end, the processor 1400 may control a phase controller that may be included in the transceiver circuit 1250 or the antenna module 1100.

Figure 12:
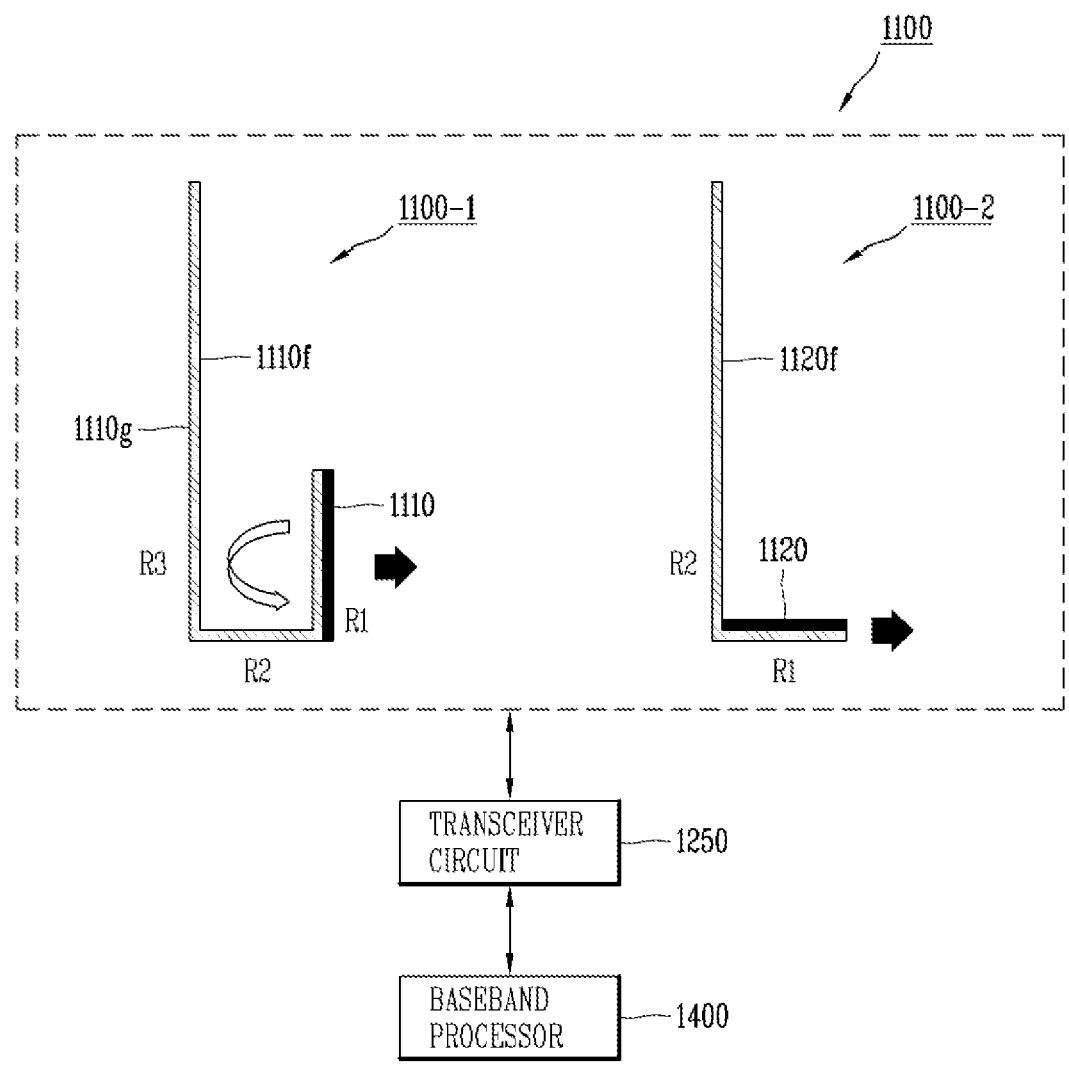
FIG. 12 shows a configuration of a plurality of antenna modules, a transceiver circuit, and a processor which are implemented on a flexible substrate according to the present disclosure.
Figure 13:
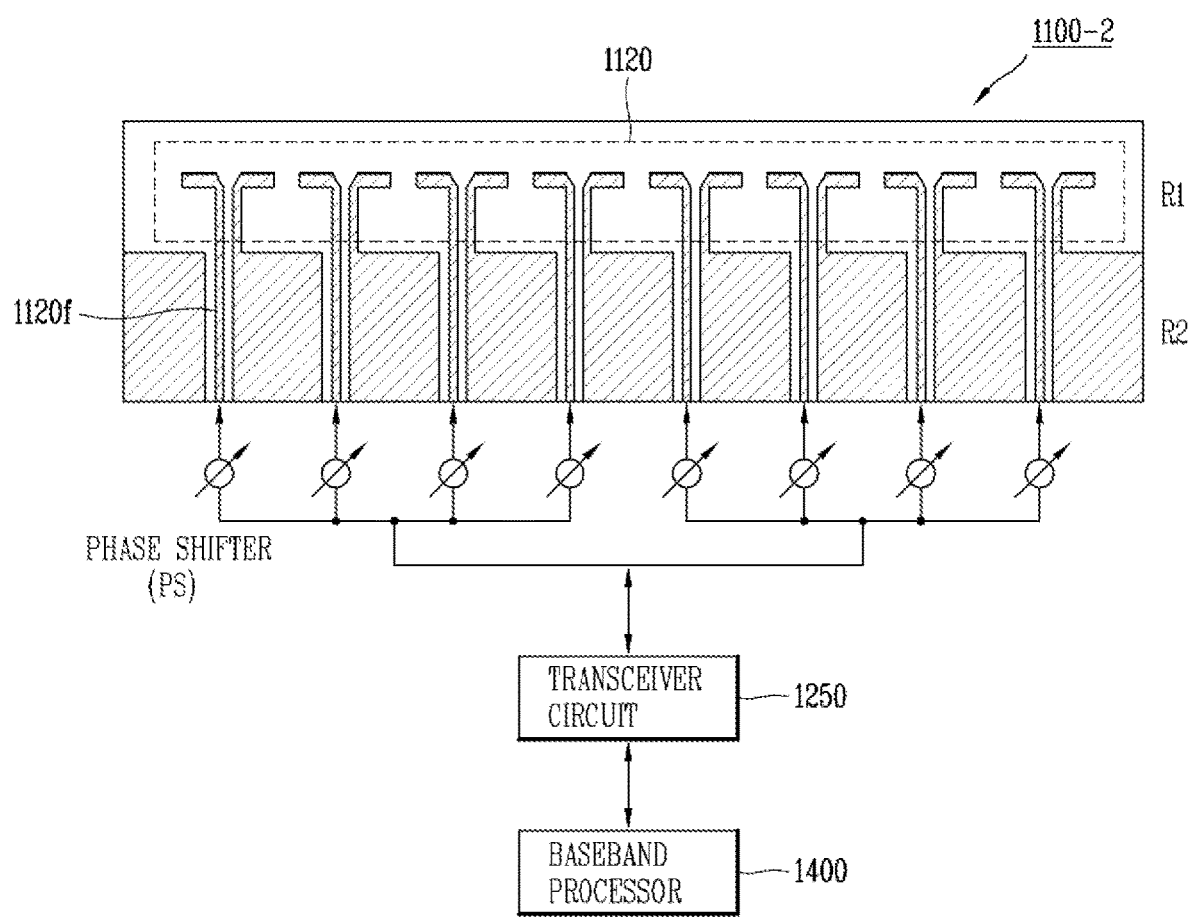
FIG. 13 shows a configuration in which a second antenna module radiating a horizontally polarized signal is formed on a second flexible substrate according to an embodiment.

The antenna module 1100 disclosed in the present disclosure may be composed of a plurality of antenna modules, and the transceiver circuit and the processor may be operably coupled to control the plurality of antenna modules. In relation to this, FIG. 12 shows a configuration of a plurality of antenna modules, a transceiver circuit, and a processor which are implemented on a flexible substrate according to the present disclosure. Meanwhile, FIG. 13 shows a configuration in which a second antenna module radiating a horizontally polarized signal is formed on a second flexible substrate according to an embodiment.

Referring to FIGS. 5 to 13, the electronic device 100 may further include a transceiver circuit 1250 and a processor 1400. The transceiver circuit 1250 may be operably coupled to the antenna module 1100. The processor 1400 may be operably coupled to the transceiver circuit 1250 and may be configured to control the transceiver circuit 1250. In this regard, the processor 1400 may be a baseband processor. However, the processor 1400 is not limited thereto, and may alternatively be any processor that controls the transceiver circuit 1250.

The antenna module 1100 may include a first antenna module 1100-1 and a second antenna module 1100-2. The first antenna module 1100-1 may include a slot array antenna 1110 composed of a plurality of slot radiating elements and a first feeding portion 1110*f* so as to radiate a vertically polarized signal toward the front surface of the electronic device. Meanwhile, the second antenna module 1100-1 may include an array antenna 1120 composed of a plurality of slot radiating elements and a second feeding portion 1120*f* so as to radiate a horizontally polarized signal toward the front surface of the electronic device.

The array antenna 1120 may be disposed in the first region R1 of the second flexible substrate and configured to radiate a horizontally polarized signal in a millimeter-wave band toward the front surface of the electronic device. In relation to this, each radiating element of the array antenna 1120 may be composed of an end-fire radiating element such as a dipole antenna or a monopole antenna. The horizontally polarized signal radiated through the array antenna 1120 may be beam-formed and radiated toward the front surface of the electronic device.

Meanwhile, the second feeding portion 1120*f* may be disposed in the first region R1 of the flexible substrate and the second region R2 bent from the first region R1, so as to apply a signal to each radiating element of the array antenna.

In this regard, the first region R1 and second region R2 of the second flexible substrate may correspond to a lower region and rear region of the electronic device.

The processor 1400 may control the transceiver circuit 1250 so that the first antenna module 1100-1 and the second antenna module 1100-2 send or receive a signal by the same beam or different beams. In relation to this, when the electronic device performs MIMO with a nearby set-top box or another electronic device, a signal may be sent or received using the same beam. Alternatively, in the case of a DC operation in which the electronic device performs communication simultaneously with a nearby set-top box and another electronic device, a signal may be sent or received using different beams. However, when the electronic device performs MIMO with a single nearby device, too, a signal may be sent or received using different beams.

The processor 1400 may control the transceiver circuit 1250 so as to beam-form a vertically polarized signal by controlling the phase of a signal applied to each slot radiating element of the first antenna module 1100-1. Also, the processor 1400 may control the transceiver circuit 1250 so as to beam-form a horizontally polarized signal by controlling the phase of a signal applied to each radiating element of the second antenna module 1100-2.

As described above, the processor 1400 may perform MIMO with another electronic device by using the first antenna module 1100-1 and the second antenna module 1100-2. In relation to this, the processor 1400 may generate a vertically polarized signal through the first antenna module 1100-1 and at the same time generate a horizontally polarized signal through the second antenna module 1100-2, thereby controlling the transceiver circuit 1250 so as to perform MIMO with another electronic device.

Moreover, the processor 1400 may perform beamforming and MIMO by using the first antenna module 1100-1 and the second antenna module 1100-2. In relation to this, the processor 1400 may perform beamforming of a vertically polarized signal through the first antenna module 1100-1 and at the same time perform beamforming of a horizontally polarized signal through the second antenna module 1100-2. Meanwhile, the processor 1400 may control the transceiver circuit 1250 so as to receive or send a vertically polarized signal formed in a first direction and a horizontally polarized signal formed in a second direction from or to another electronic device.

In addition, the processor 1400 may perform carrier aggregation (CA) by sending or receiving signals of different bands by using the first antenna module 1100-1 and the second antenna module 1100-2. In relation to this, the processor 1400 may control the transceiver circuit 1250 so as to send a vertically polarized signal of a first band through the first antenna module 1100-1 and a horizontally polarized signal of a second band through the second antenna module 1100-2. Also, the processor 1400 may control the transceiver circuit 1250 so as to receive a vertical polarized signal of a first band through the first antenna module 1100-1 and a horizontally polarized signal of a second band through the second antenna module 1100-2. In relation to this, the vertically polarized signal of the first band and the horizontally polarized signal of the second band may be signals of different bands in a mmWave band.

Figure 14A:
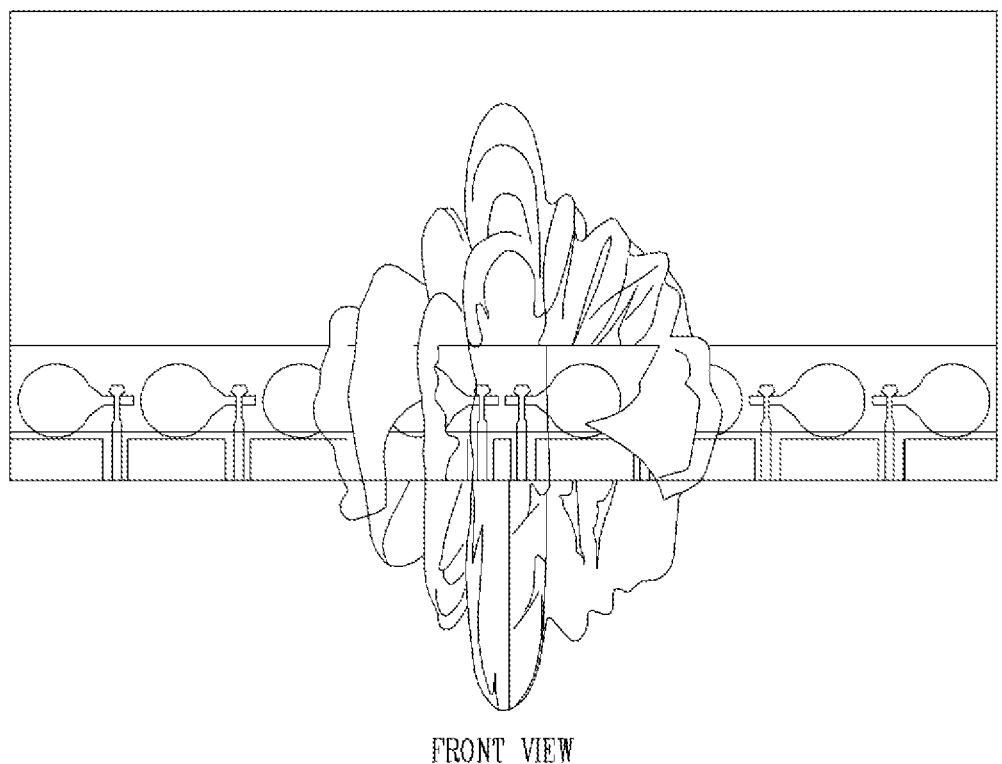
FIGS. 14A and 14B are views of a configuration of a vertical polarized antenna having a U-shaped bending structure according to the present disclosure and a corresponding radiation pattern as viewed from different directions.
Figure 14B:
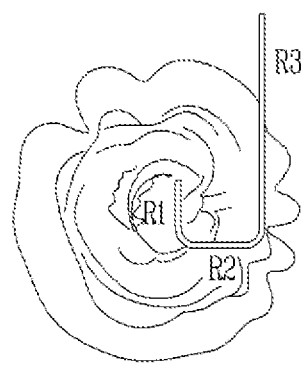
Figure 14B:
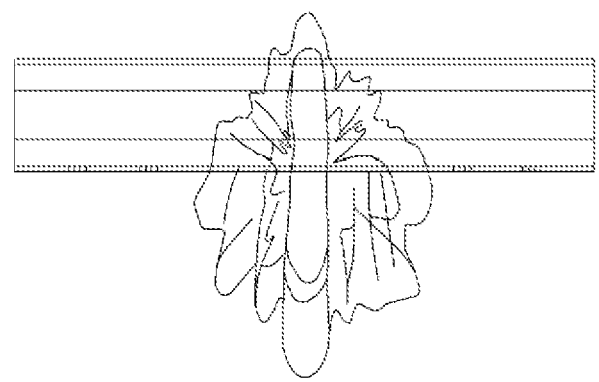
Figure 14B:
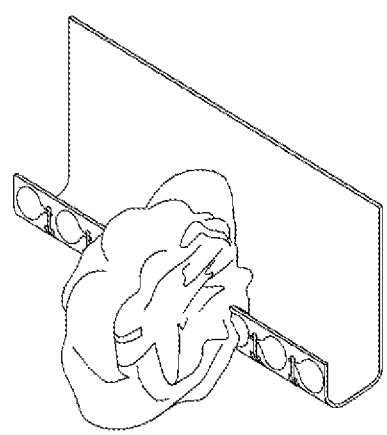
Figure 15A:
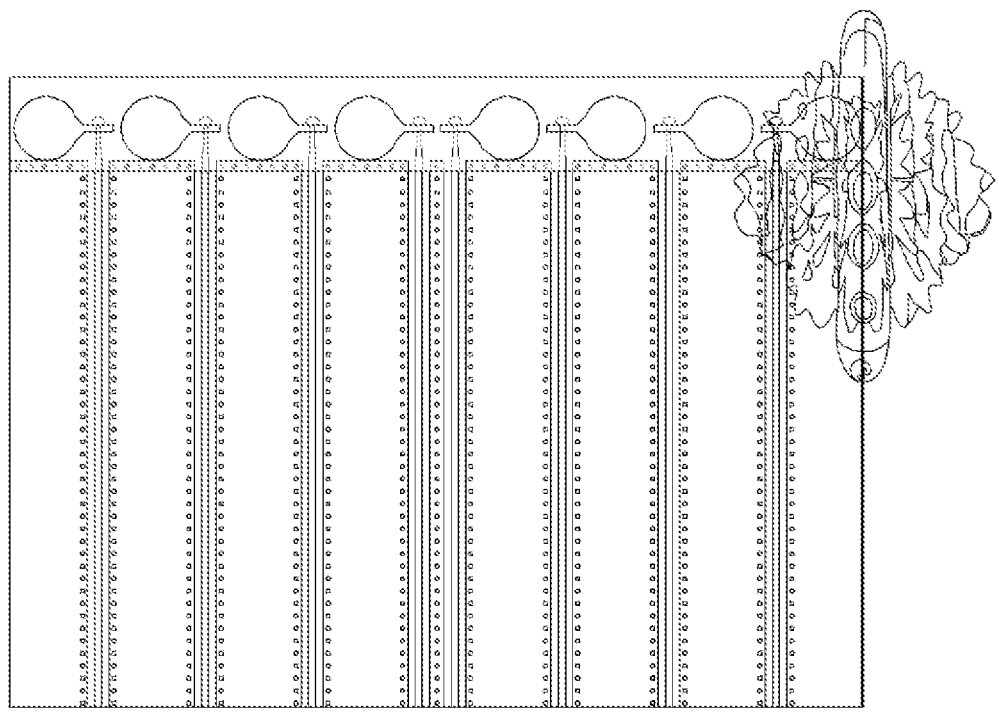
FIGS. 15A and 15B show a vertical polarized antenna module with a slot array antenna with no bending structure.
Figure 15B:
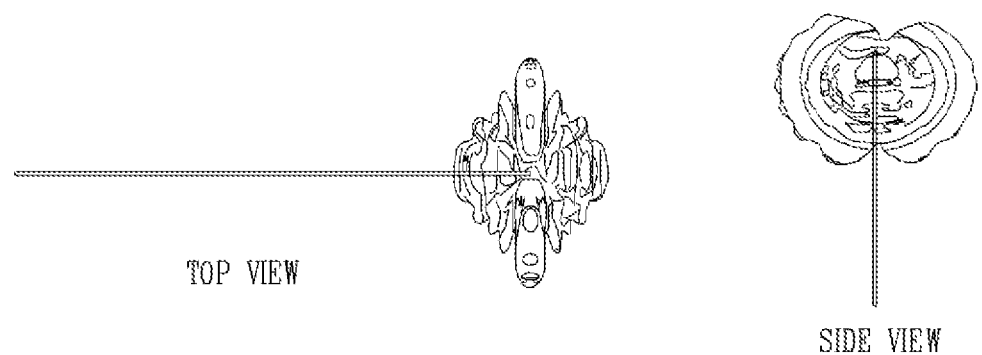
Figure 15B:
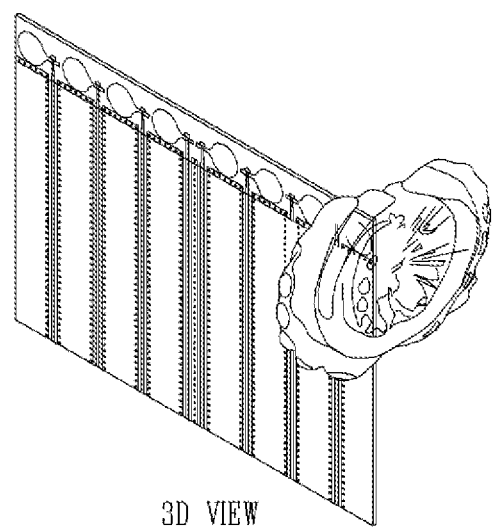

A vertical polarized antenna proposed in the present disclosure may be implemented in a U-shape having a bending structure as shown in FIG. 7 and (e) of FIG. 10. A vertical polarized antenna module having such a U-shaped bending structure may be configured as a slot array antenna. In relation to this, FIGS. 14A and 14B are views of a configuration of a vertical polarized antenna having a U-shaped bending structure according to the present disclosure and a corresponding radiation pattern as viewed from different directions. FIGS. 15A and 15B show a vertical polarized antenna module with a slot array antenna with no bending structure.

Referring to FIGS. 7, 8A, 8B, and 14A, a vertically polarized signal is radiated toward the front through the first region R1 corresponding to a front portion of the slot array antenna 1100. An antenna beam pattern having horizontal directivity is formed by a 1×8 slot array antenna 1100. In relation to this, the number of slot radiating elements of the slot array antenna 1100 is not limited to 8, but may be varied to 2, 4, 6, 10, 12, 14, or 16 depending on applications. Meanwhile, the second region R2 and third region R3 of the flexible substrate where the feeding portion 1110f is disposed corresponds to a side region and rear region of the flexible substrate. The shape of a combination of an antenna portion and a feeding portion is a U-shape or a J-shape, and a region corresponding to the feeding portion 1110f may operate as a reflector, thereby forming a beam in one direction without a reflector.

Referring to FIG. 14B, a side view, front view, and a third-dimensional perspective view of a flexible substrate where a slot array antenna is disposed are illustrated. Referring to FIG. 14A and the side view and third-dimensional perspective view of the flexible substrate, an antenna beam pattern is formed in a front direction corresponding to the first region R1 where the slot array antenna 1110 is disposed. As for the slot radiating elements, since no ground region is disposed on a rear surface of the flexible substrate, an antenna beam may be formed in a rear direction as well. However, rear radiation components may be directed toward the front by the ground region formed in the third region R3.

Referring to FIG. 15A, a front view of an antenna structure in which a feeding portion and an antenna region are formed on a single substrate without a bending structure is illustrated. A radiation pattern of a slot array antenna formed on a single substrate without a bending structure is formed in the form of ripples.

Referring to FIG. 15B, a front view, side view, and three-dimensional perspective view of a substrate where a slot array antenna with no bending structure is disposed are illustrated. Referring to FIG. 15A and the side view and three-dimensional perspective view of the single substrate, beams are formed in both the front and rear directions of the substrate through the slot array antenna. Accordingly, the peak gain of the antenna is lower than that of the antenna formed in the bending structure of FIGS. 14A and 14B by about 1.5 dB or more. To solve this problem, the present disclosure proposes a slot array antenna having a U-shaped or J-shaped bending structure.

Meanwhile, according to another embodiment of the present disclosure, a slot array antenna may be implemented on a single antenna substrate, i.e., a flexible substrate, by a plurality of antenna modules. In relation to this, FIGS. 16a and 16B show a configuration in which a plurality of slot array antenna modules is implemented on a flexible substrate.

Figure 16A:
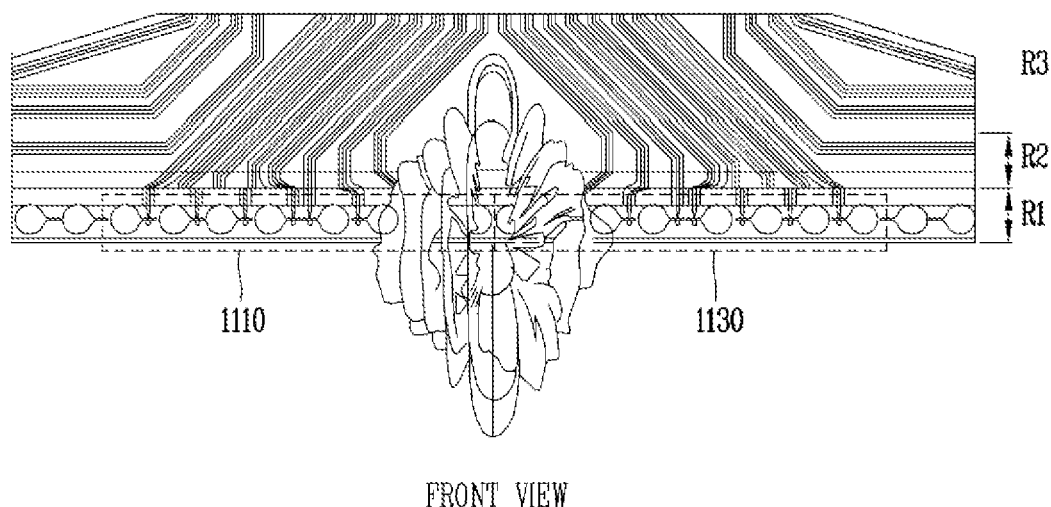
FIGS. 16A and 16B show a configuration in which a plurality of slot array antenna modules is implemented on a flexible substrate.

Referring to FIG. 16A, a first slot array antenna 1110 and a third slot array antenna 1130 may be disposed in a first region R1 corresponding to a front region of a flexible substrate. In relation to this, the third slot array antenna 1130 may be configured to radiate no signal while the first slot array antenna 1110 sends a signal. Meanwhile, the first slot array antenna 1110 may be configured to radiate no signal while the third slot array antenna 1130 receives a signal. However, the present disclosure is not limited to such signal transmission/reception operation, but the signal transmission/reception operation of the first slot array antenna 1110 and third slot array antenna 1130 having the same polarization may vary depending on applications.

Figure 16B:
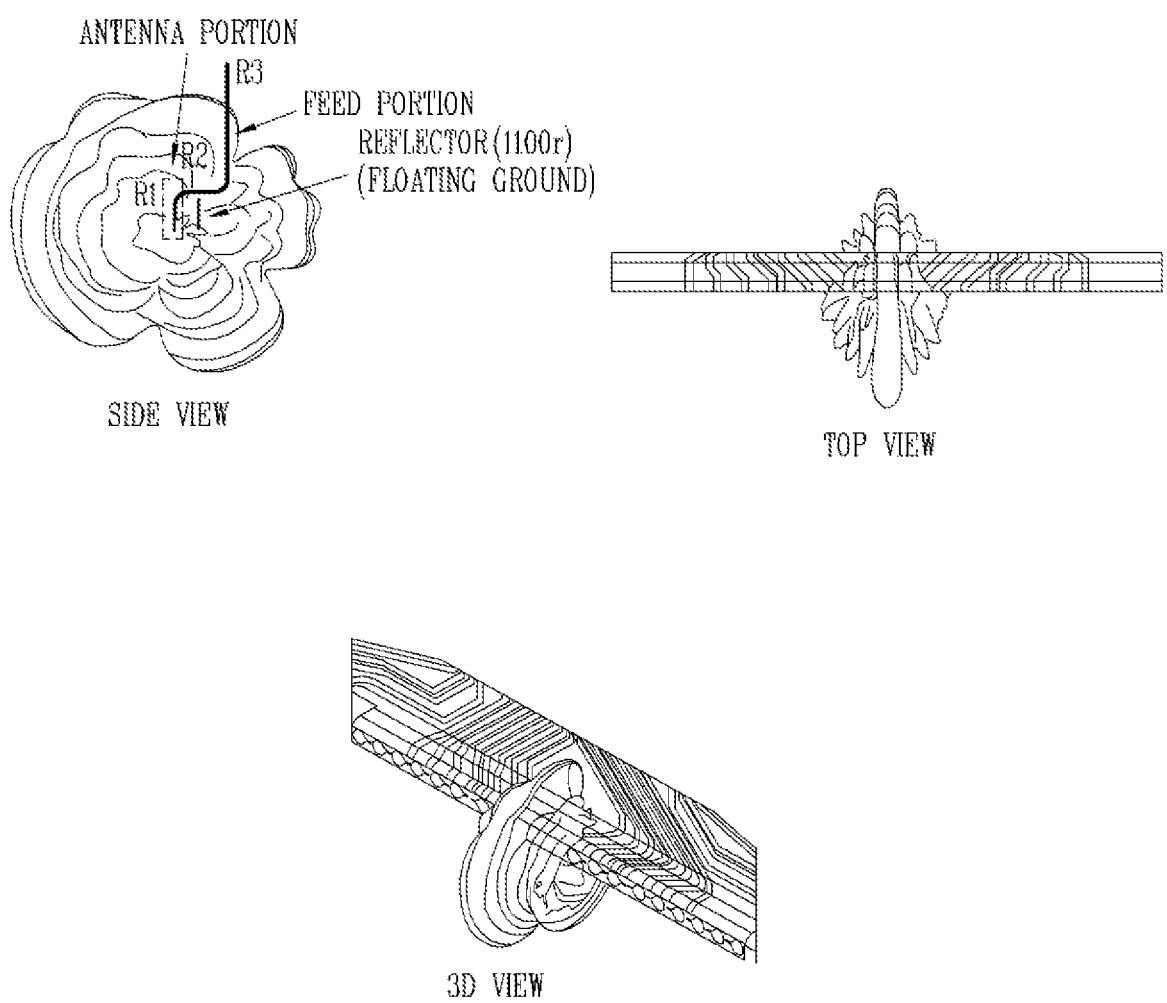

Referring to FIG. 16B, the first to third regions R1 to R3 of the slot array antennas may have a bending structure, as shown in (f) of FIG. 10. In other words, the first region R1 of the flexible substrate may be formed below the second region R2 so as not to overlap the third region R3. In this regard, a reflector 1000r may be disposed which is configured to reflect a rear radiation signal by the slot array antennas 1110 and 1130 formed in the first region R1 and radiate it to the front.

Various changes and modifications to the foregoing embodiments related to a vertical/horizontal polarized antenna and an electronic device for controlling the same can be clearly understood by those skilled in the art without departing from the spirt and scope of the present disclosure. Therefore, it should be understood that such various modifications and alternations for the implementations fall within the scope of the appended claims.

In the above, an electronic device 100 having an antenna module 1100 according to one aspect of the present disclosure has been described. Hereinafter, an antenna module 1100 provided in an electronic device 100 according to another aspect of the present disclosure will be described. In this regard, the above description of the electronic device 100 having the antenna module 1100 is applicable to the following antenna module 1100.

In relation to this, referring to FIGS. 1 to 16B, the antenna module 1100 may include a slot array antenna 1110 and 1110b and a feeding portion 1110f and 1110fb.

The slot array antenna 1110 and 1110b may be disposed in a first region of a flexible substrate so as to radiate a vertically polarized signal in a millimeter-wave band. The feeding portion 1110f and 1110fb may be configured to apply a signal to each of slot radiating elements of the slot array antennas 1110 and 1110b. The feeding portion 1110f and 1110fb may be disposed in a second region R2 bent from the first region R1 and a third region R3 bent from the second region R2, so as to apply a signal to each of slot radiating elements of the slot array antenna 1110 and 1110b. The first region R1 and third region R3 of the flexible substrate may correspond to a front region and rear region of the electronic device.

For example, the first region R1 of the flexible substrate may be formed above the second region R2 so as to overlap at least part of the third region R3 of the flexible substrate. In this regard, a rear radiation signal radiated to the third region R3 through each slot radiating element of the slot array antenna 1110b may be reflected by a metal pattern formed in the third region R3 and radiated to the front region.

As another example, the first region R1 of the flexible substrate may be formed below the second region R2 so as not to overlap the third region R3 of the flexible substrate. A rear radiation signal radiated to the third region R3 through each slot radiating element of the slot array antenna 1200 may be reflected by a reflector 1110R formed in a rear region, apart from the third region R3, and radiated to the first region R1.

Meanwhile, the antenna module 1100 disclosed in the present disclosure may be a first antenna module 1100-1 including a plurality of slot radiating elements and a first feeding portion 1110f so as to radiate a vertically polarized signal toward the front surface of the electronic device. The antenna module 1100 may further include a second antenna module 1100-2 including a plurality of radiating elements and a second feeding portion 1120*f* so as to radiate a horizontally polarized signal toward the front surface of the electronic device.

The second antenna module 1100-2 may include an array antenna 1120 which is disposed in a first region R1 of a second flexible substrate and radiates a horizontally polarized signal in a millimeter-wave band toward the front surface of the electronic device. Also, the second antenna module 1100-2 may further include a second feeding portion 1120*f* which is disposed in the first region R1 of the second flexible substrate and a second region R2 bent from the first region R1 so as to apply a signal to each radiating element of the array antenna. In this regard, the first region R1 and second region R2 of the second flexible substrate may correspond to a lower region and rear region of the electronic device.

Figure 17A:
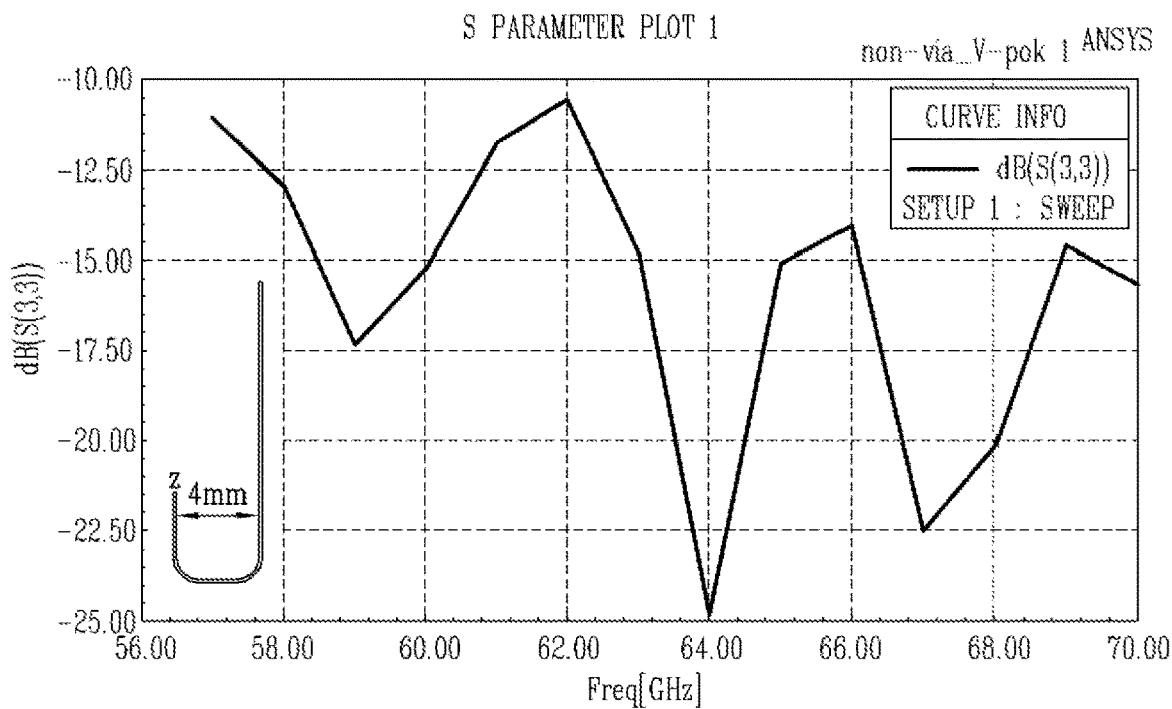
FIGS. 17A and 17B show a comparison of reflection coefficient characteristics between a slot array antenna having a bending structure and a slot array antenna having no bending structure.
Figure 17B:
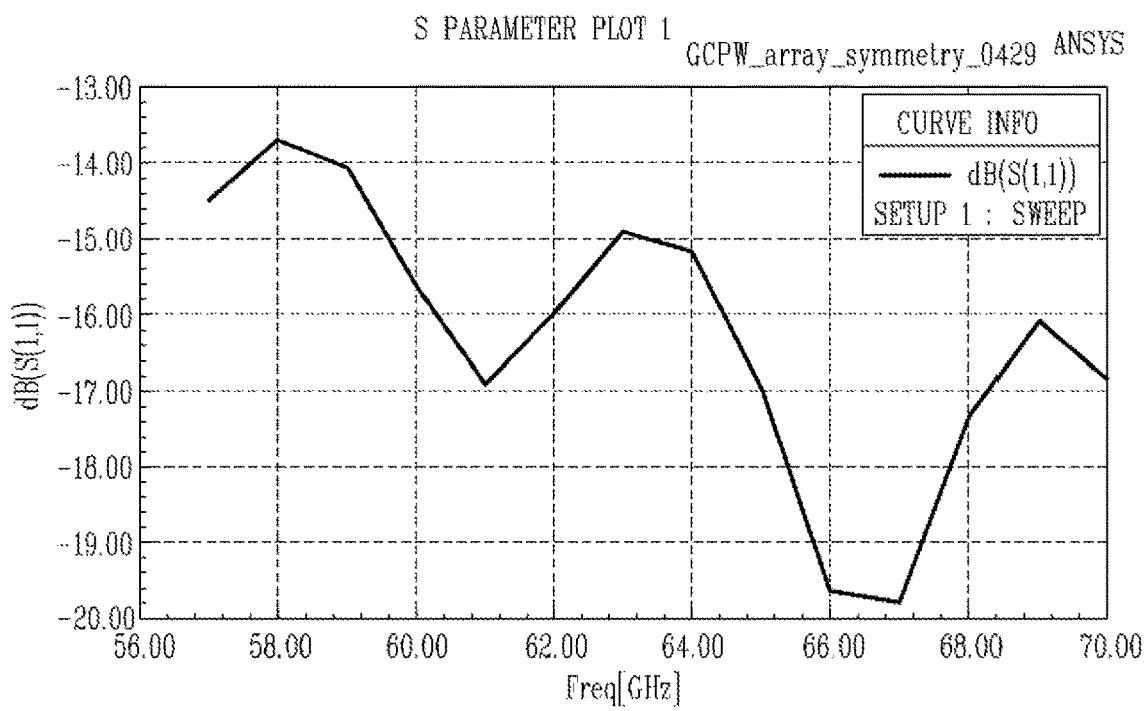

Meanwhile, a slot array antenna disclosed in the present disclosure may be implemented as a U-shaped or J-shaped bending structure, as described above. In this regard, the description of how the formation of ripples in the radiation pattern is prevented through a slot array antenna having a bending structure has been made with reference to FIGS. 15A and 15B. Meanwhile, reflection coefficient characteristics of a slot array antenna having a bending structure satisfy reference values in a band of 57 GHz to 70 GHz. In this regard, FIGS. 17A and 17*b* show a comparison of reflection coefficient characteristics between a slot array antenna having a bending structure and a slot array antenna having no bending structure. FIG. 17A shows reflection coefficient characteristics of a slot array antenna disposed in a first region of a flexible substrate which is divided into first to third regions by being bent twice. On the other hand, FIG. 17B shows reflection coefficient characteristics of an antenna module with a slot array antenna and a feeding portion formed therein without a bending structure.

Referring to FIG. 17A, in a case where an antenna module is configured by bending, the antenna module having a bending structure satisfies a bandwidth requirement of 57 GHz to 70 GHz with respect to VSWR 2:1 (S11, −10 dB). Meanwhile, referring to FIG. 17B, an antenna module with a slot array antenna and a feeding portion formed therein without a bending structure also satisfies the bandwidth requirement of 57 GHz to 70 GHz with respect to VSWR 2:1 (S11, −10 dB).

Accordingly, due to wideband characteristics of the slot antenna, the reflection coefficient characteristics satisfy the bandwidth requirement of 57 GHz to 70 GHz regardless of bending of the antenna module. Meanwhile, in relation to requirements for an antenna radiation pattern, it can be seen that the radiation pattern of an antenna formed on a single substrate without bending, as shown in FIGS. 15A and 15B, was more deteriorated than the radiation pattern of an antenna having a bending structure as shown in FIGS. 14A and 14B. In this regard, the radiation pattern may be deteriorated due to ripples generated by unwanted radiation caused by the feeding portion which is made long on the same plane as the radiator.

Figure 18A:
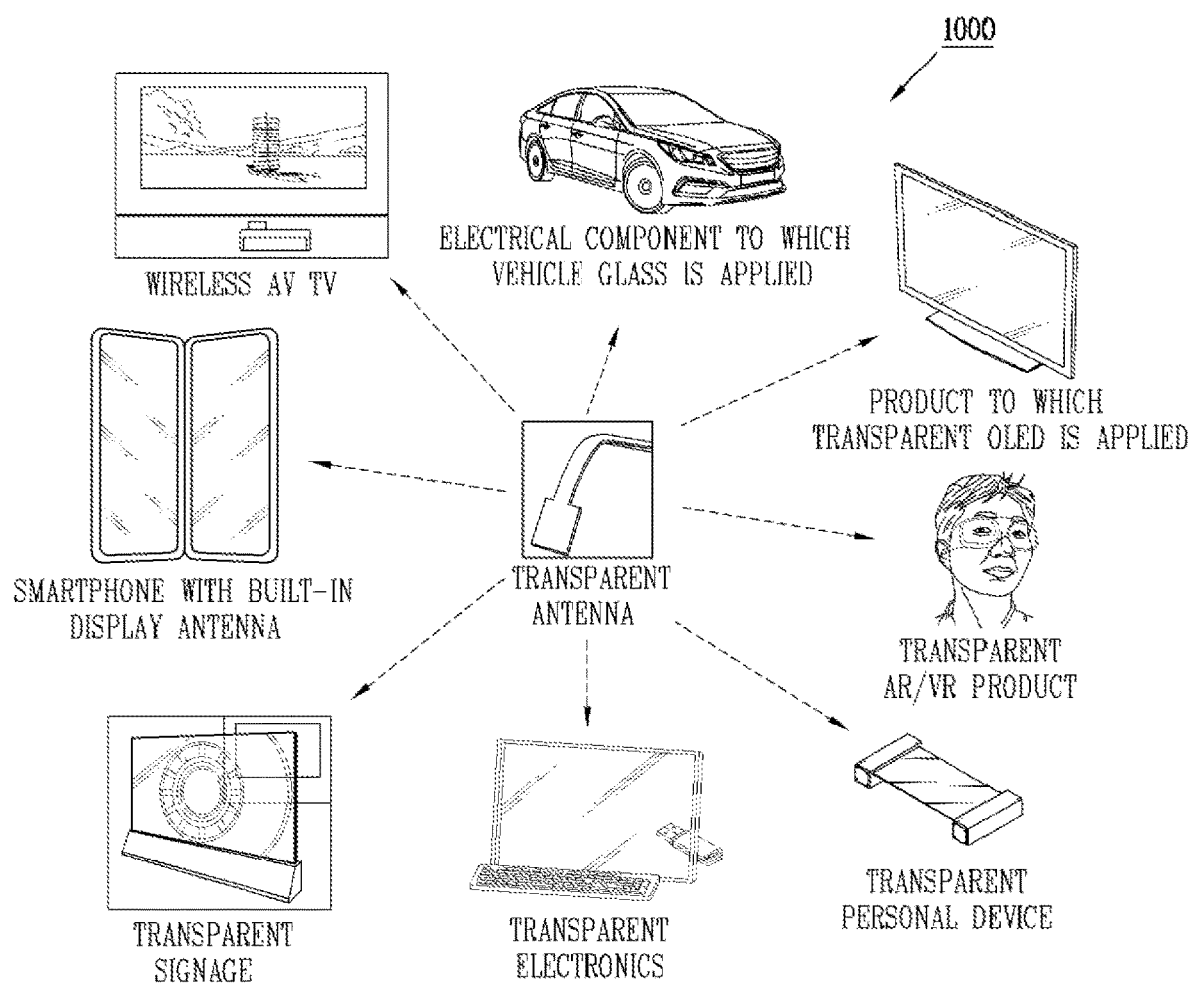
FIG. 18A shows an example in which an mmWave antenna module proposed in the present disclosure is applied to various electronic devices.

An mmWave antenna module proposed in the present disclosure is applicable to various electronic devices. In relation to this, FIG. 18A shows an example in which an mmWave antenna module proposed in the present disclosure is applied to various electronic devices. Referring to FIGS. 1 to 18A, the electronic device 1000 may be at least one of a mobile terminal, signage, a display device, a transparent AR/VR equipment, a vehicle, or wireless audio/video equipment. Meanwhile, the first antenna module 1100-1 or second antenna module 1100-2 constituting the antenna module may be disposed in a lower region or side region of the electronic device 100. For example, the antenna 1100 operating by vertical/horizontal polarization may be disposed in various forms at a lower portion of the electronic device.

Figure 18B:
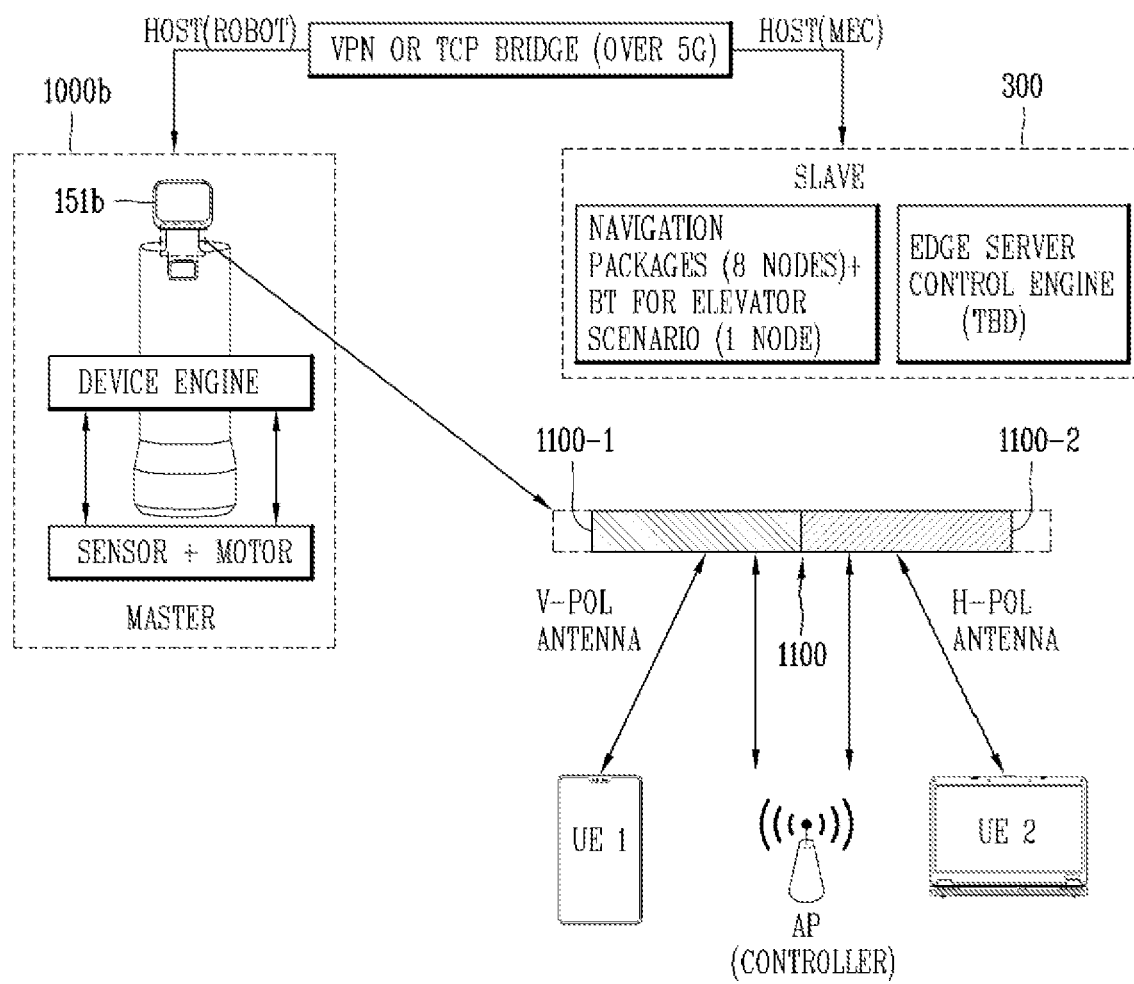
FIG. 18B shows an embodiment in which an antenna operating by vertical/horizontal polarization proposed in the present disclosure is applied to a robot.

Meanwhile, FIG. 18B shows an embodiment in which an antenna 1100 operating by vertical/horizontal polarization proposed in the present disclosure is applied to a robot. Referring to FIGS. 1 to 18B, an antenna module 1100 may be disposed at a lower portion of a display 151*b* of a robot 1000*b*. The antenna module 1100 may be implemented as one of various combinations of the first antenna module 1100-1 and/or the second antenna module 1100-2 and operate as a multimode antenna. The antenna module 1100 may operate in a 5G mmWave band. Using such an antenna module 1100, the robot 1000*b* may send or receive high-speed, large-capacity wireless data, for example, wireless AV data, to or from a nearby electronic device.

The robot 1000*b* may interface with a server 300 over a communication network under control of a controller such as a device engine. In this case, the communication network may be a 5G communication network. The communication network may be implemented by a VPN or TCP bridge. The robot 1000*b* may be connected to an MEC server 300 via the communication network. Since the robot 1000*b* interfaces with the MEC server 300, this robot/network system may be referred to as a cloud robotic system. The cloud robotics system is a system that processes functions required for the robot 1000*b* to perform a given task in a cloud server such as the MEC server 300.

In the above, a multimode/multiband antenna and an electronic device for controlling the same according to the present disclosure has been described. A wireless communication system including such a multimode/multiband antenna, an electronic device for controlling the same, and a base station will be described below. In this regard, FIG. 19 illustrates a block diagram of a wireless communication system to which methods proposed in the present disclosure are applicable.

Figure 19:
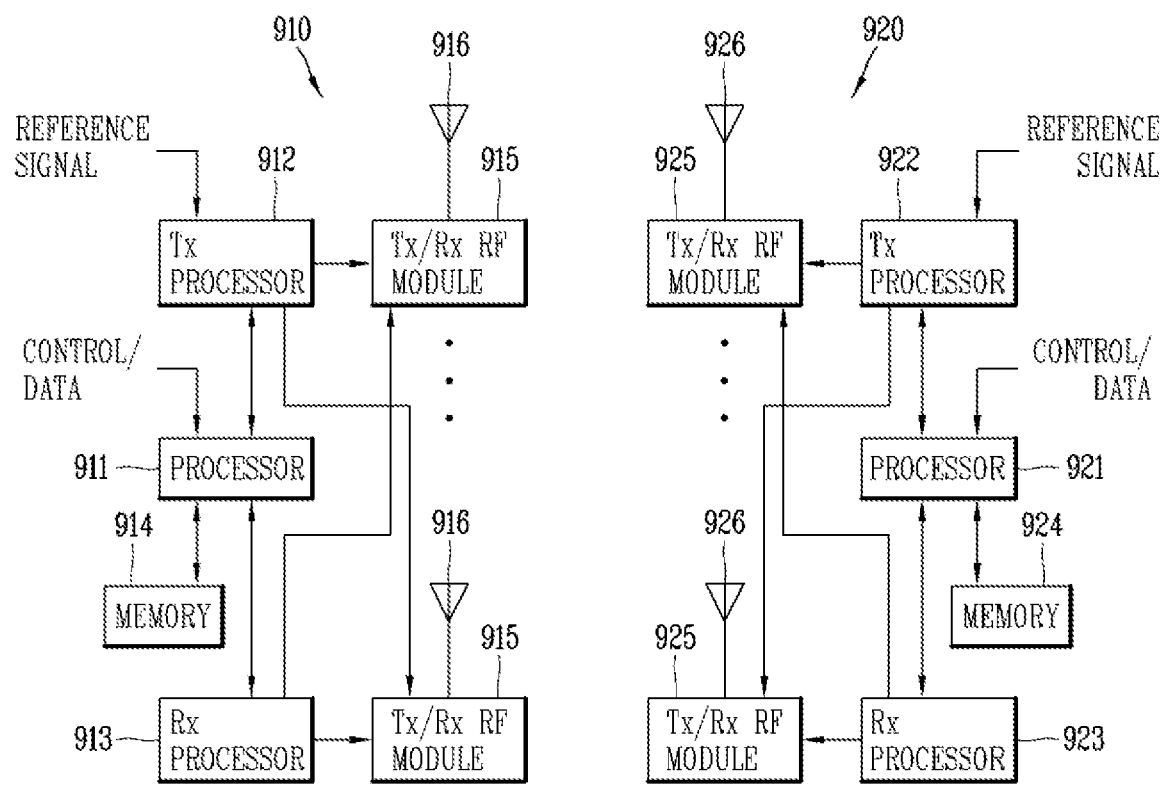
FIG. 19 illustrates a block diagram of a wireless communication system to which methods proposed in the present disclosure are applicable.

Referring to FIG. 19, the wireless communication system includes a first communication device 910 and/or a second communication device 920. The term 'A and/or B' may be interpreted as having the same meaning as 'at least one of A and B'. The first communication device may denote a base station and the second communication device may denote a terminal (or the first communication device may denote the terminal or the vehicle and the second communication device may denote the base station).

The base station (BS) may be replaced with a term such as a fixed station, a Node B, an evolved-NodeB (eNB), a next generation NodeB (gNB), a base transceiver system (BTS), an access point (AP), a general NB (gNB), a 5G system, a network, an AI system, a road side unit (RSU), robot or the like. In addition, the terminal may be fixed or have mobility, and may be replaced with a term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, a vehicle, a robot, an AI module, or the like.

The first communication device and the second communication device each may include a processor 911, 921, a memory 914, 924, one or more Tx/Rx radio frequency modules 915, 925, a Tx processor 912, 922, an Rx processor 913, 923, and an antenna 916, 926. The processor may implement the aforementioned functions, processes, and/or methods. More specifically, in DL (communication from the first communication device to the second communication device), an upper (high-level) layer packet from a core network may be provided to the processor 911. The processor implements the function of an L2 layer. In DL, the processor may provide multiplexing between a logical channel and a transport channel and radio resource allocation to the second communication device 920, and may be in charge of signaling to the second communication device. The Tx processor 912 may implement various signal processing functions for an L1 layer (i.e., a physical layer). The signal processing function may facilitate forward error correction (FEC) in the second communication device, and include coding and interleaving. An encoded and modulated symbol may be divided into parallel streams. Each stream may be mapped to an OFDM subcarrier wave, multiplexed with a reference signal (RS) in a time and/or frequency domain, and combined together using an Inverse Fast Fourier Transform (IFFT) to create a physical channel carrying a time-domain OFDMA symbol stream. The OFDM stream may be spatially precoded to generate multiple spatial streams. The spatial streams may be provided to different antennas 916 via individual Tx/Rx modules (or transceiver) 915, respectively. The Tx/Rx modules may modulate RF carrier waves into the spatial streams for transmission. The second communication device may receive a signal through the antenna 926 of each Tx/Rx module (or transceiver) 925. Each Tx/Rx module may demodulate information modulated to an RF carrier, and provide it to the RX processor 923. The RX processor may implement various signal processing functions of Layer 1. The RX processor may perform spatial processing with respect to the information in order to recover an arbitrary spatial stream destined for the second communication device. When a plurality of spatial streams are destined for the second communication device, the spatial streams may be combined into a single OFDMA symbol stream by a plurality of RX processors. The RX processor may transform the OFDMA symbol stream from a time domain to a frequency domain by using Fast Fourier Transform (FFT). A frequency domain signal may include an individual OFDMA symbol stream on a subcarrier for each OFDM signal. Symbols on each subcarrier and a reference signal may be recovered and demodulated by determining the most probable signal placement points transmitted by the first communication device. These soft decisions may be based on channel estimate values. The soft decisions may be decoded and deinterleaved to recover data and control signal originally transmitted over the physical channel by the first communication device. The corresponding data and control signal may then be provided to the processor 921.

UL (communication from the second communication device to the first communication device) may be processed in the first communication device 910 in a similar manner to that described with respect to the receiver function in the second communication device 920. The Tx/Rx modules 925 may receive signals via the antennas 926, respectively. The Tx/Rx modules may provide RF carriers and information to the RX processor 923, respectively. The processor 921 may operate in conjunction with the memory 924 in which a program code and data are stored. The memory may be referred to as a computer-readable medium.

As seen above, an electronic device capable of providing a wireless AV service and an array antenna module provided in the electronic device have been described. Technical effects of such an electronic device capable of providing a wireless AV service and an array antenna module provided in the electronic device will be described below.

According to an embodiment, a slot array antenna configuration capable of providing a wireless AV service to an electronic device, and an electronic device having a slot array antenna may be provided.

According to an embodiment, a vertically polarized antenna configuration may be provided which is disposed at a lower portion of an image display device so as to send or receive high-speed, large-volume data.

According to an embodiment, multiple input multiple output (MIMO) may be provided by disposing an array antenna having different polarizations so as to send or receive high-speed, large-volume data.

According to an embodiment, a slot array antenna having a reflector structure may be provided which operates in a millimeter-wave (mmWave) band which allows for radiating signals toward the front or side of the electronic device.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

In relation to the aforementioned disclosure, design and operations of an electronic device capable of providing a wireless AV service and an array antenna module disposed in the electronic device can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:
1. An electronic device having an antenna, comprising:
 a display formed on a front surface of the electronic device and configured to display information on a screen; and
 an antenna module disposed at a lower portion of the electronic device and configured to radiate a vertically polarized signal to the front surface of the electronic device,
 the antenna module including:
 a slot array antenna disposed in a first region of a flexible substrate so as to radiate the vertically polarized signal in a millimeter-wave band; and
 a feeding portion disposed in a second region bent from the first region and in a third region bent from the second region so as to apply a signal to each of slot radiating elements of the slot array antenna,
 wherein the first region and third region of the flexible substrate correspond to a front region and rear region of the electronic device, wherein the first region of the flexible substrate is formed above the second region so as to overlap at least part of the third region of the flexible substrate, and wherein a rear radiation signal radiated to the third region through each slot radiating element of the slot array antenna is reflected by a metal pattern formed in the third region and radiated to the front region.

2. The electronic device of claim 1, wherein the metal pattern formed in the third region corresponds to the feeding portion.

3. The electronic device of claim 1, wherein the distance between the first region and third region of the flexible substrate is determined within a predetermined range of ¼ of the operation wavelength of the vertically polarized signal, and the rear radiation signal and a front radiation signal are propagated in phase.

4. The electronic device of claim 1, further comprising:
a transceiver circuit operably coupled to the antenna module; and
a processor operably coupled to the transceiver circuit and configured to control the transceiver circuit,
wherein each of the slot radiating elements is formed of a circular slot, the feeding portion is formed along a vertical axis, and a rectangular slot connected to an end of each of the slot radiating elements is formed along a horizontal axis so as to be perpendicular to the feeding portion.

5. The electronic device of claim 4, wherein a vertically polarized signal of the feeding portion formed along the vertical axis is coupled through the rectangular slots, and the processor controls the transceiver circuit so that the vertically polarized signal is beam-formed toward the front surface of the electronic device through the circular slots connected to the rectangular slots.

6. The electronic device of claim 1, further comprising:
a transceiver circuit operably coupled to the antenna module; and
a processor operably coupled to the transceiver circuit and configured to control the transceiver circuit,
wherein the antenna module includes:
a first antenna module including a plurality of slot radiating elements and a first feeding portion so as to radiate a vertically polarized signal toward the front surface of the electronic device; and
a second antenna module including a plurality of slot radiating elements and a second feeding portion so as to radiate a horizontally polarized signal toward the front surface of the electronic device.

7. The electronic device of claim 6, wherein the second antenna module includes:
an array antenna disposed in the first region of the second flexible substrate and radiating a horizontally polarized signal in a millimeter-wave band toward the front surface of the electronic device; and
a second feeding portion disposed in the first region of the flexible substrate and the second region bent from the first region, so as to apply a signal to each radiating element of the array antenna,
wherein the first region and second region of the second flexible substrate correspond to a lower region and rear region of the electronic device.

8. The electronic device of claim 7, wherein each radiating element of the array antenna is composed of an end-fire radiating element such as a dipole antenna or a monopole antenna, and the horizontally polarized signal radiated through the array antenna is beam-formed and radiated toward the front surface of the electronic device.

9. The electronic device of claim 7, wherein the processor controls the transceiver circuit so as to beam-form a vertically polarized signal by controlling the phase of a signal applied to each slot radiating element of the first antenna module, and the processor controls the transceiver circuit so as to beam-form a horizontally polarized signal by controlling the phase of a signal applied to each radiating element of the second antenna module.

10. The electronic device of claim 7, wherein the processor generates a vertically polarized signal through the first antenna module and at the same time generates a horizontally polarized signal through the second antenna module, thereby controlling the transceiver circuit so as to perform MIMO with another electronic device.

11. The electronic device of claim 7, wherein the processor performs beamforming of a vertically polarized signal through the first antenna module and at the same time performs beamforming of a horizontally polarized signal through the second antenna module, and the processor controls the transceiver circuit so as to receive or send a vertically polarized signal formed in a first direction and a horizontally polarized signal formed in a second direction from or to another electronic device.

12. The electronic device of claim 1, wherein the electronic device is a mobile terminal, signage, a display device, a transparent AR/VR equipment, a vehicle, or wireless audio/video equipment, and the first antenna module or second antenna module constituting the antenna module is disposed in a lower region or side region of the electronic device.

13. An antenna module provide in an electronic device, the antenna module comprising:
a slot array antenna disposed in a first region of a flexible substrate so as to radiate the vertically polarized signal in a millimeter-wave band; and
a feeding portion disposed in a second region bent from the first region and in a third region bent from the second region so as to apply a signal to each of slot radiating elements of the slot array antenna,
wherein the first region and third region of the flexible substrate correspond to a front region and rear region of the electronic device,
wherein the first region of the flexible substrate is formed above the second region so as to overlap at least part of the third region of the flexible substrate, and a rear radiation signal radiated to the third region through each slot radiating element of the slot array antenna is reflected by a metal pattern formed in the third region and radiated to the front region.

14. The antenna module of claim 13, wherein the antenna module is a first antenna module including a plurality of slot radiating elements and a first feeding portion so as to radiate a vertically polarized signal toward the front surface of the electronic device, and further includes a second antenna module including a plurality of slot radiating elements and a second feeding portion so as to radiate a horizontally polarized signal toward the front surface of the electronic device,
the second antenna module including:
an array antenna disposed in the first region of the second flexible substrate and radiating a horizontally polarized signal in a millimeter-wave band toward the front surface of the electronic device; and
a second feeding portion disposed in the first region of the flexible substrate and the second region bent from the first region, so as to apply a signal to each radiating element of the array antenna, wherein the first region and second region of the second flexible substrate correspond to a lower region and rear region of the electronic device.

\* \* \* \* \*